United States Patent
Lanci et al.

(10) Patent No.: US 10,227,539 B2
(45) Date of Patent: *Mar. 12, 2019

(54) NOBLE METAL HYDROGENATION CATALYSTS AND AROMATIC SATURATION METHODS

(71) Applicant: ExxonMobil Research and Engineering Company, Annandale, NJ (US)

(72) Inventors: Michael P. Lanci, Flemington, NJ (US); Stuart L. Soled, Pittstown, NJ (US); Javier Guzman, Kingwood, TX (US); Sabato Miseo, Pittstown, NJ (US); Thomas E. Green, Hamilton, NJ (US); Joseph E. Baumgartner, Califon, NJ (US); Lei Zhang, Basking Ridge, NJ (US); Christine E. Kliewer, Clinton, NJ (US); Lukasz Koziol, Morristown, NJ (US); Kanmi Mao, Clinton, NJ (US); Tracie L. Owens, Hillsborough, NJ (US); Gary P. Schleicher, Milford, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/198,346

(22) Filed: Jun. 30, 2016

(65) Prior Publication Data

US 2016/0304795 A1    Oct. 20, 2016

Related U.S. Application Data

(63) Continuation-in-part of application No. 14/714,703, filed on May 18, 2015.

(Continued)

(51) Int. Cl.
*C10G 45/00* (2006.01)
*C10M 101/02* (2006.01)
(Continued)

(52) U.S. Cl.
CPC ........... *C10M 101/02* (2013.01); *B01J 23/42* (2013.01); *B01J 23/44* (2013.01); *B01J 31/0241* (2013.01);
(Continued)

(58) Field of Classification Search
CPC ........ C10G 45/34; C10G 45/46; C10G 45/52; C10G 65/12; C10G 69/02; C10G 2300/202; C10M 101/02; C10M 2203/1006

See application file for complete search history.

(56) References Cited

U.S. PATENT DOCUMENTS 5,098,684 A    3/1992  Kresge et al.
5,198,203 A    3/1993  Kresge et al.
(Continued)

FOREIGN PATENT DOCUMENTS

GB    790476 A        2/1958
GB    1501346 A       2/1978
WO    2012134484 A1   10/2012

OTHER PUBLICATIONS

The International Search Report and Written Opinion of PCT/US2017/037416 dated Aug. 23, 2017.
(Continued)

*Primary Examiner* — Prem C Singh
*Assistant Examiner* — Brandi M Doyle
(74) *Attorney, Agent, or Firm* — Scott F. Yarnell

(57) ABSTRACT

Methods are provided for modifying hydrogenation catalysts having silica supports (or other non-alumina supports) with additional alumina, and using such catalysts to achieve (Continued)

unexpectedly superior hydrogenation of feedstocks. The modified hydrogenation catalysts can have a relatively low cracking activity while providing an increased activity for hydrogenation.

12 Claims, 13 Drawing Sheets

Related U.S. Application Data

(60) Provisional application No. 62/009,373, filed on Jun. 9, 2014.

(51) Int. Cl.

| | | |
|---|---|---|
| *B01J 23/42* | (2006.01) | |
| *B01J 23/44* | (2006.01) | |
| *B01J 31/02* | (2006.01) | |
| *B01J 31/28* | (2006.01) | |
| *B01J 37/02* | (2006.01) | |
| *C10G 45/34* | (2006.01) | |
| *C10G 45/46* | (2006.01) | |
| *C10G 45/52* | (2006.01) | |
| *C10G 65/12* | (2006.01) | |
| *B01J 37/08* | (2006.01) | |
| *B01J 35/00* | (2006.01) | |
| *B01J 37/00* | (2006.01) | |
| *B01J 21/12* | (2006.01) | |
| *B01J 23/46* | (2006.01) | |

(52) U.S. Cl.
CPC ............ *B01J 31/28* (2013.01); *B01J 35/006* (2013.01); *B01J 37/0009* (2013.01); *B01J 37/0201* (2013.01); *B01J 37/0203* (2013.01); *B01J 37/0207* (2013.01); *B01J 37/088* (2013.01); *C10G 45/34* (2013.01); *C10G 45/46* (2013.01); *C10G 45/52* (2013.01); *C10G 65/12* (2013.01); *B01J 21/12* (2013.01); *B01J 23/464* (2013.01); *B01J 23/468* (2013.01); *C10G 2300/202* (2013.01); *C10M 2203/1006* (2013.01)

(56) References Cited

U.S. PATENT DOCUMENTS

| | | | |
|---|---|---|---|
| 6,288,007 B1* | 9/2001 | Lindblad | B01J 21/12 502/232 |
| 6,485,702 B1 | 11/2002 | Lujano et al. | |
| 6,569,312 B1 | 5/2003 | Carroll et al. | |
| 2005/0194289 A1* | 9/2005 | Overbeek | B01D 53/02 208/120.01 |
| 2006/0070915 A1 | 4/2006 | Euzen et al. | |
| 2009/0313890 A1* | 12/2009 | Lopez | C10G 45/44 44/385 |
| 2014/0249344 A1 | 9/2014 | Minoux et al. | |

OTHER PUBLICATIONS

The International Search Report and Written Opinion of PCT/US2015/031465 dated Aug. 11, 2015.

Beck, J.S. et al., "A New Family of Mesoporous Molecular Sieves Prepared with Liquid Crystal Templates", Journal of the American Chemical Society, 1992, vol. 114, pp. 10834-10843.

* cited by examiner

| | Pt/Pd ratio | Pt (wt %) | Pd (wt %) | g Pt | moles Pt | g Pt solution | moles Pd | g Pd solution | moles Pd+Pt |
|---|---|---|---|---|---|---|---|---|---|
| 6a | 1:0 | 0.80 | 0 | 0.16 | 0.000082 | 0.319 | 0 | 0 | 0.000820 |
| 6b | 0:1 | 0 | 0.4365 | 0 | 0.000000 | 0.000 | 0.000082 | 1.027 | 0.000820 |
| 6c | 1:1 | 0.40 | 0.2183 | 0.08 | 0.000041 | 0.160 | 0.000041 | 0.514 | 0.000820 |
| 6d | 3:1 | 0.601 | 0.1085 | 0.1202 | 0.000062 | 0.240 | 0.000020 | 0.255 | 0.000820 |
| 6e | 5:1 | 0.667 | 0.073 | 0.1334 | 0.000068 | 0.266 | 0.000014 | 0.172 | 0.000821 |
| 6f | 1:3 | 0.199 | 0.328 | 0.0398 | 0.000020 | 0.079 | 0.000062 | 0.772 | 0.000820 |
| 6g | 1:5 | 0.127 | 0.368 | 0.0254 | 0.000013 | 0.051 | 0.000069 | 0.866 | 0.000822 |
| 6h | 2:1 | 0.53 | 0.145 | 0.1068 | 0.000055 | 0.213 | 0.000027 | 0.341 | 0.000820 |
| 6i | 1:2 | 0.27 | 0.29 | 0.054 | 0.000028 | 0.108 | 0.000055 | 0.682 | 0.000822 |

FIG. 1

| Example # | Catalyst Description | Temp (°C) | Rate mol/mol$_{Pt}$/h | TOF mol/mol$_{surf Pt}$/h |
|---|---|---|---|---|
| 1 | Pt(Arg)/SiO$_2$ Arginine prep. | 300 | 306 | 585 |
| 3a | 1.0% Al$_2$O$_3$ IW/Pt(Arg) (Al added to Pt/Si) | 300 | 6893 | 16984 |
| 3b | 2.1% Al$_2$O$_3$ IW/Pt(Arg) (Al added to Pt/Si) | 300 | 2429 | 5609 |
| 3b-R | Pt(Arg)/2.1% Al$_2$O$_3$ IW/SiO$_2$ (Pt added to Al/Si) | 300 | 5568 | 16140 |
| 5f | Pt(Arg)/1% Al$_2$O$_3$ IW/SiO$_2$ (Pt added to Al/Si) | 300 | 5671 | 16729 |
| 7 | (1% Al$_2$O$_3$ + Pt(Arg)(8:1 to mols Pt)) on SiO$_2$ coimpregnation | 300 | 3544 | 12479 |

FIG. 9

NOBLE METAL HYDROGENATION CATALYSTS AND AROMATIC SATURATION METHODS

CROSS-REFERENCE TO RELATED APPLICATIONS

This application is a continuation-in-part application of co-pending U.S. application Ser. No. 14/714,703 titled "Noble Metal Hydrogenation Catalysts with Low Cracking Activity", filed on May 18, 2015, the entirety of which is incorporated herein by reference, which application claims priority to U.S. Provisional Application 62/009,373, titled "Noble Metal Hydrogenation Catalysts with Low Cracking Activity", filed on Jun. 9, 2014.

FIELD

This disclosure relates to hydrogenation catalysts and methods for using such catalysts.

BACKGROUND

Catalysts with aromatic saturation and/or olefin saturation activity are employed in a variety of manners in a refinery setting. For example, in lubricant base oil production, a final aromatic saturation step in the presence of a catalyst with high activity for aromatic saturation can be valuable for reducing the aromatics content of the base oil product. Catalysts with hydrogenation activity can also be useful for treating an effluent from a hydroprocessing, cracking, or hydrocracking process to reduce the olefin content or aromatic content of the cracked product.

U.S. Pat. No. 6,288,007 describes a hydrogenation catalyst with high sulfur tolerance. One version of the hydrogenation catalyst can include a silica substrate impregnated with a noble metal that also includes a surface-modification with an aluminum-containing compound. Examples of catalysts having silica substrates are described that include surface-modification amounts of 2.9 wt %, 5.8 wt %, and 8.1 wt % of aluminum.

SUMMARY

In some aspects, a hydrogenation catalyst is provided. The hydrogenation catalyst can include 0.1 wt % to 5.0 wt %, based on total catalyst weight, of a Group VIII noble metal on a silica support. The hydrogenation catalyst can further include 1.0 wt % to 2.5 wt %, based on a total catalyst weight, of alumina deposited on the silica support. The catalyst can have a ratio of aluminum atoms in tetrahedral sites to octahedral sites of at least 1.0. Optionally, the silica support can be an amorphous silica support, a mesoporous silica support, or a combination thereof. Optionally, the ratio of aluminum atoms in tetrahedral sites to octahedral sites can be at least 1.5, or at least 2.0. Optionally, the catalyst can include 1.0 wt % (or 1.1 wt %) to 2.2 wt % (or 2.1 wt %) of alumina deposited on the silica support.

In some aspects, a method for forming a lubricant boiling range product can be provided. The method can include exposing a 600° F.+ (316° C.+) portion of a hydrocracked effluent to a supported catalyst under effective hydrogenation conditions to form a hydrogenated effluent. The supported catalyst can comprise 0.1 wt % to 5.0 wt % of a Group VIII noble metal on a silica support. The supported catalyst can further include about 0.3 wt % to about 2.5 wt % alumina deposited on the silica support. The supported catalyst can have a ratio of aluminum atoms in tetrahedral sites to octahedral sites of at least 1.0 (optionally at least 1.5, or at least 2.0). The hydrogenated effluent can then optionally be dewaxed under catalytic dewaxing conditions to form a dewaxed effluent. At least a portion of the dewaxed effluent can optionally be hydrofinished under hydrofinishing conditions to form a hydrofinished effluent comprising a lubricant boiling range product.

BRIEF DESCRIPTION OF THE DRAWINGS

FIG. 1 shows examples of hydrogenation catalysts made using varying amounts of Pd and Pt as hydrogenation metals.

FIG. 9 shows activities for various hydrogenation catalysts.

DETAILED DESCRIPTION

Figure 2:
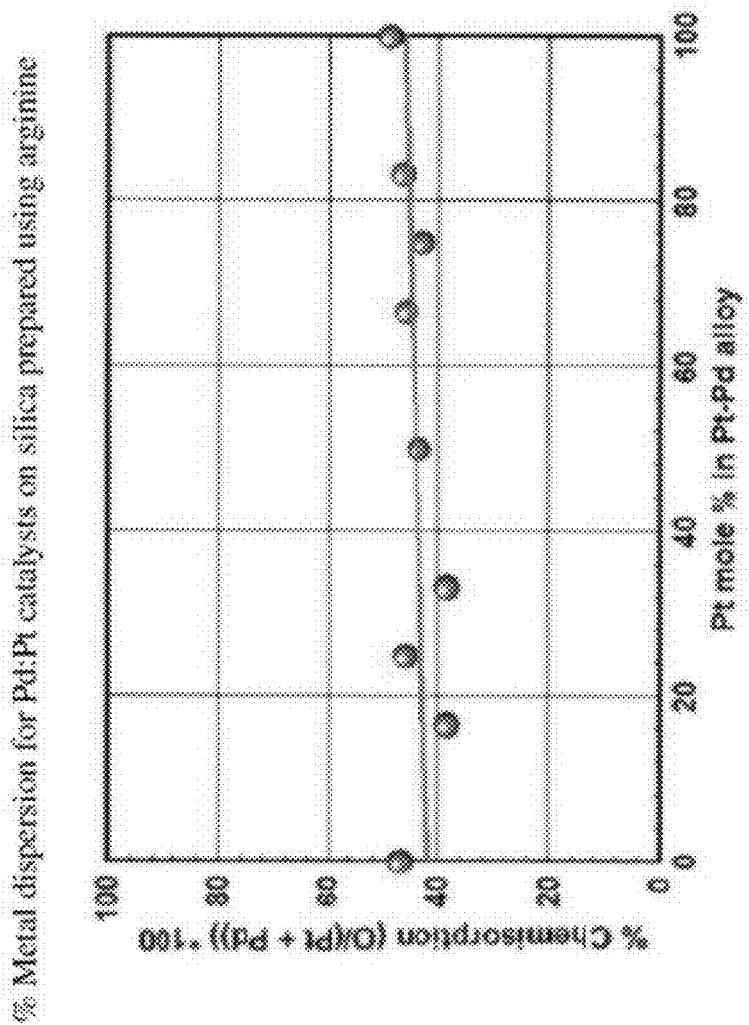
FIG. 2 shows metal dispersion values for various hydrogenation catalysts.

All numerical values within the detailed description and the claims herein are modified by "about" or "approximately" the indicated value, and take into account experimental error and variations that would be expected by a person having ordinary skill in the art.

In various aspects, methods are provided for modifying hydrogenation catalysts having silica supports (or other non-alumina supports) with additional alumina, and using such catalysts to achieve unexpectedly superior hydrogenation of feedstocks. The modified hydrogenation catalysts can have a relatively low cracking activity while providing an increased activity for hydrogenation. This can allow use of the modified hydrogenation catalysts for performing hydrogenation of a feedstock at higher temperatures while causing a reduced or minimized amount of cracking of the feedstock. The modified hydrogenation catalysts also exhibit unexpectedly high activity for performing hydrogenation relative to the activity for an unmodified catalyst and/or a catalyst modified with other different amounts of alumina.

Conventional hydrogenation catalysts can often correspond to catalysts that are designed to balance a desire for sufficient hydrogenation activity with a conflicting desired for a reduced or minimized activity for catalyzing other types of chemistry, such as cracking of hydrocarbonaceous compounds. A common conventional catalyst to balance these desired activities is a catalyst with a noble metal on a refractory oxide support. Examples of conventional catalysts include catalysts with Pt or Pd supported on a support such as silica, alumina, silica-alumina, or another metal oxide support.

Conventionally, catalysts using a silica support have not been favored due to lower hydrogenation activity and/or low metal dispersion. Use of an alumina or a silica-alumina support can provide increased hydrogenation activity, but at the cost of also increasing the cracking activity of the resulting catalyst. With regard to the choice of hydrogenation metal, Pt has traditionally been considered as offering higher activity than Pd for hydrogenation. However, catalysts including only Pt as a hydrogenation metal have sometimes suffered an undesirable activity loss when used on a feedstock containing moderate (or greater) amounts of sulfur. Pd has been used as hydrogenation metals for aromatic saturation catalysts where environments with higher amounts of sulfur are expected. However, such catalysts have a lower initial activity for hydrogenation due to the reduced activity of Pd. Another option has been to try to use both Pt and Pd, to provide the increased activity of Pt while still obtaining some of the benefit of Pd for tolerating higher sulfur content feedstocks.

In some aspects, it is desired to provide a catalyst with improved hydrogenation activity where the amount of increase in the corresponding cracking activity of the catalyst is reduced or minimized. Additionally, in some aspects it is desired to provide a hydrogenation catalyst that can maintain an activity advantage when used for hydrogenation of a feedstock containing at least about 50 wppm of sulfur, or at least about 100 wppm of sulfur, or at least about 150 wppm of sulfur, or at least about 200 wppm of sulfur, or at least about 250 wppm of sulfur.

In order to at least partially achieve the above desired goals, a catalyst can be provided that includes a noble metal on a silica substrate, where additional alumina is also deposited/impregnated on the substrate. The alumina can be deposited, impregnated, or otherwise placed on the silica substrate in any convenient manner. The alumina can be added to the catalyst prior to addition of the hydrogenation metal, during addition of the hydrogenation metal, or after addition of the hydrogenation metal. The alumina-modified catalyst can provide improved hydrogenation activity for both feeds with sulfur contents below about 50 wppm as well as feeds with higher sulfur contents, such as feeds with at least about 100 wppm of sulfur, or at least about 150 wppm of sulfur, or at least about 200 wppm of sulfur, or at least about 250 wppm of sulfur.

In order to achieve an unexpected activity increase, the amount of alumina added to the catalyst can be in a specified range. In some aspects, the amount of alumina added to a catalyst can be about 0.1 wt % to about 3.0 wt %, or about 0.3 wt % to about 3.0 wt %, or about 0.3 wt % to about 2.5 wt %, or about 0.3 wt % to about 2.2 wt %, or about 0.3 wt % to about 2.0 wt %, or about 0.3 wt % to about 1.8 wt %, or about 0.3 wt % to about 1.6 wt %, or about 0.3 wt % to about 1.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.2 wt %, or about 1.1 wt % to about 2.1 wt %. For alumina amounts greater than the desired range, some activity enhancement is produced by addition of alumina. However, the activity enhancement is substantially lower than the activity enhancement within the specified range. For alumina amounts less than the desired range, the activity of the catalyst can be similar to the activity of a catalyst without added alumina, or alternatively similar to the activity of catalysts having additional alumina amounts that are greater than the desired range.

Conventionally, it has been believed or suspected that the activity of catalysts with hydrogenation metals deposited on a metal oxide support can be impacted by the amount of dispersion of the hydrogenation metals. Under such a conventional understanding, further impregnation or other deposition of alumina on a catalyst could lead to lower metal dispersion values. However, it has been unexpectedly determined that deposition of alumina on a Pt impregnated catalyst can result in a reduced or minimized impact on the dispersion of the Pt. This high metal dispersion value can be maintained during hydrogenation of a feed.

Feedstocks

A wide range of petroleum and chemical feedstocks are suitable for processing by exposing the feedstock to an alumina-modified catalyst under effective conditions for hydrogenation and/or aromatic saturation in accordance with the disclosure. Suitable hydrocarbonaceous feedstocks can include raw or virgin feeds as well as feeds that have previously been processed (such as hydroprocessed) in one or more reaction stages. Examples of suitable hydrocarbonaceous feedstocks include, but are not limited to, whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, feeds derived from biological sources, raffinates, naphtha boiling range fractions (boiling range of about 36° C. or about the boiling point of n-pentane to about 177° C.), hydrotreated naphtha boiling range fractions, diesel or other distillate fuel boiling range fractions (about 177° C. to about 370° C.), hydrotreated diesel or other distillate fuel boiling range fractions, lubricant base oil boiling range fractions (about 370° C. to about 538° C.), hydrotreated lubricant base oil boiling range fractions, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. It is noted that the boiling ranges noted above can correspond to boiling ranges defined by initial and final boiling points, T5 and T95 boiling points, T10 and T90 boiling points, or combinations thereof. For example, the lubricant base oil boiling range can correspond to an initial, T5, or T10 boiling point of about 370° C. and a final, T95, or T90 boiling point of about 538° C. Similarly, the diesel boiling range can be an initial, T5, or T10 boiling point of about 177° C. and a final, T95, or T90 boiling point of about 370° C. Boiling points, including fractional weight boiling points, can be determined using a suitable ASTM method, such as ASTM D2887. For samples that include compounds that cannot be readily characterized using ASTM D2887, an alternative appropriate ASTM method can be used instead, such as ASTM D1160 or ASTM D86.

The sulfur content of the feed can be any convenient amount, but preferably less than about 1000 wppm. In some aspects, the sulfur content of a feed exposed to the hydrogenation catalyst can be about 100 wppm or less, or about 50 wppm or less, or about 25 wppm or less, or about 15 wppm or less. In some aspects, the sulfur content of a feed exposed to a hydrogenation catalyst can be from 0 wppm to about 1000 wppm, or about 500 wppm or less, or about 300 wppm or less. Examples of ranges for sulfur content can include about 30 wppm to about 1000 wppm, or about 50 wppm to about 1000 wppm, or about 100 wppm to about 1000 wppm, or about 200 wppm to about 1000 wppm, or about 250 wppm to about 1000 wppm, or about 30 wppm to about 500 wppm, or about 50 wppm to about 500 wppm, or about 100 wppm to about 500 wppm, or about 200 wppm to about 500 wppm, or about 250 wppm to about 500 wppm, or about 10 wppm to about 1000 wppm, or about 10 wppm to about 500 wppm, or about 50 wppm to about 300 wppm, or about 100 wppm to about 300 wppm, or about 200 wppm to about 300 wppm, or about 10 wppm to about 1000 wppm. In particular, the sulfur content can be about 30 wppm to about 1000 wppm, or about 50 wppm to about 1000 wppm.

In aspects where a process flow includes an initial hydrotreatment process and/or a sour hydrocracking process, a feed can have a sulfur content of at least about 30 wppm. In particular, a feed can have a sulfur content of about 30 wppm to about 20000 wppm, or about 500 wppm to about 10000 wppm, or about 500 wppm to about 5000 wppm. Additionally or alternately, the nitrogen content of a feed can be about 50 wppm to about 4000 wppm, or about 50 wppm to about 2000 wppm.

In some aspects, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus Jatropha. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Modified Silica-Supported Hydrogenation Catalysts

In some aspects, a hydrogenation catalyst suitable for treating a feed can comprise, consist essentially of, or be a catalyst composed of one or more Group VIII metals on a silica support that is modified with alumina, as described in more detail herein. The modification with alumina can provide an unexpected enhancement in the hydrogenation activity of the catalyst.

The supported Group VIII metal(s) can include, but are not limited to, Pt, Pd, Rh, Ir, and combinations thereof. Examples of individual hydrogenation metal embodiments can include, but are not limited to, Pt only or Pd only, while mixed hydrogenation metal embodiments can include, but are not limited to, Pt and Pd, Pt and Rh, or another combination. When only one hydrogenation metal is present, the amount of that hydrogenation metal can be at least about 0.1 wt % based on the total weight of the catalyst, for example at least about 0.3 wt %, or at least about 0.5 wt %, or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 2.0 wt % or less, about 1.5 wt % or less, about 1.0 wt % or less, about 0.9 wt % or less, about 0.75 wt % or less, or about 0.6 wt % or less. Each of the lower and upper bounds identified above for the amount of the only one hydrogenation metal is explicitly contemplated in combination with each other. Thus, for example, the amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %. In particular, the amount of hydrogenation metal can be about 0.1 wt % to about 5.0 wt %, or about 0.1 wt % to about 2.0 wt %, or about 0.3 wt % to about 5.0 wt %.

When more than one hydrogenation metal is present, the collective amount of hydrogenation metals can be at least about 0.1 wt % based on the total weight of the catalyst, such as at least about 0.25 wt %, at least about 0.5 wt %, at least about 0.6 wt %, at least about 0.75 wt %, or at least about 1 wt %. Additionally or alternately, when more than one hydrogenation metal is present, the collective amount of hydrogenation metals can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Each of the lower and upper bounds identified above for the combined amount of the hydrogenation metal is explicitly contemplated in combination with each other. Thus, for example, the combined amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %. In particular, the amount of hydrogenation metal can be about 0.1 wt % to about 5.0 wt %, or about 0.1 wt % to about 2.5 wt %, or about 0.3 wt % to about 5.0 wt %. For aspects where both Pt and Pd are present as the hydrogenation metals, the ratio of Pt to Pd can be from about 1:3 to about 4:1, or from about 1:4 to about 3:1, or from about 1:2 to about 4:1, or from about 1:2 to about 3:1. The amounts of metal(s) may be measured by methods specified by ASTM for individual metals, including but not limited to atomic absorption spectrometry (AAS), inductively coupled plasma-atomic emission spectrometry (ICP-AAS), or the like.

In some aspects, the silica support can be an amorphous silica support. In other aspects, the support can be a mesoporous crystalline or semi-crystalline support material. Examples of mesoporous silica materials suitable for use as a support can include MCM-41, other M41S structures, SBA-15, and other mesoporous silicas.

The silica support can be modified with alumina to provide an unexpectedly superior activity for performing hydrogenation. The amount of alumina added to the silica support to modify the support can vary depending on the expected sulfur content of the feed for the hydrogenation process.

For general feeds and/or feeds having a sulfur content of about 100 wppm or less, or about 50 wppm or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.5 wt %, or about 1.1 wt % to about 2.2 wt %.

For feeds with sulfur contents of at least about 50 wppm, or at least about 100 wppm, such as a sulfur content of about 1000 wppm of sulfur or less, or about 500 wppm of sulfur or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.2 wt %, or about 1.1 wt % to about 2.1 wt %.

The alumina for modifying the supported catalyst can be added by any convenient method, such as impregnation using a solution containing alumina or a suitable alumina precursor. For example, an alumina precursor can be deposited by aqueous incipient wetness impregnation followed by heating the catalyst to decompose the precursor. The alumina can be added to the catalyst support at any convenient time, such as prior to, during, or after deposition of the hydrogenation metal(s) on the catalyst support. In this description, alumina added to the supported catalyst at any time after formation of the support is defined as alumina that is deposited on the support and/or the catalyst.

In some aspects, the aluminum atoms added to the silica substrate can be selectively added to tetrahedral coordination sites. For example, when the amount of alumina added corresponds to 0.3 wt % to 2.5 wt %, or 0.3 wt % to 2.2 wt %, or 0.3 wt % to 2.1 wt %, or 0.5 wt % to 2.5 wt %, or 0.5 wt % to 2.2 wt %, or 0.5 wt % to 2.1 wt %, or 1.0 wt % to 2.5 wt %, or 1.0 wt % to 2.2 wt %, or 1.0 wt % to 2.1 wt %, or 1.1 wt % to 2.5 wt %, or 1.1 wt % to 2.2 wt %, or 1.1 wt % to 2.1 wt %, the aluminum atoms added to the silica substrate can be preferentially added to tetrahedral coordination sites as opposed to octahedral coordination sites. The nature of how aluminum atoms are added to a silica substrate can be determined, for example, by $^{27}$Al NMR. When aluminum atoms are selectively added to tetrahedral coordination sites, the ratio of aluminum atoms in tetrahedral sites to octahedral sites can be at least 1.0, or at least 1.5, or at least 2.0. Without being bound by any particular theory, it is believed that preferential incorporation of aluminum atoms into tetrahedral coordination sites allows for preferential incorporation of aluminum in a lower acidity manner that provides enhanced aromatic saturation activity without substantially modifying the reduced cracking activity provided by the silica support. For example, acidic Al atoms can potentially create adsorption sites to provide increased aromatic compound surface density on the silica support and/or to serve as a reservoir of reactants for available hydrogen.

Hydrogenation or aromatic saturation conditions can include temperatures from about 25° C. to about 425° C., such as about 75° C. to about 425° C., or about 100° C. to about 425° C., for example about 180° C. to about 280° C.; a hydrogen partial pressure from about 100 psig (0.7 MPa) to about 3000 psig (20.7 MPa), preferably about 500 psig (3.4 MPa) to about 2500 psig (17.2 MPa); and a liquid hourly space velocity from about 0.1 hr$^{-1}$ to about 5 hr$^{-1}$ LHSV, preferably about 0.5 hr$^{-1}$ to about 1.5 hr$^{-1}$. Additionally, a hydrogen treat gas rate of from about 35.6 m$^3$/m$^3$ to about 1781 m$^3$/m$^3$ (200 SCF/B to 10,000 SCF/B) can be used.

Hydroprocessing for Lubricant Base Oil Production

In addition to aromatic saturation using a catalyst corresponding to a noble metal (or metals) on an alumina-modified silica support, a variety of other types of hydroprocessing can be used during lubricant base oil production. Examples of suitable processes for forming a hydroprocessed effluent that includes lubricant boiling range products can be lubricant base oil production processes and/or a fuels hydrocracking processes. In these types of processes, a feed that has at least a portion boiling in the lubricant boiling range (or higher), is hydrocracked to perform at least some conversion on the higher boiling range portion of the feed. This can result in improvements in the viscosity index and other properties of the higher boiling portions of the feed. Lubricant base oils can then be formed from the higher boiling portions, usually after performing additional processing steps such as dewaxing, hydrofinishing, aromatic saturation, and/or fractionation. A typical lubricant base oil production process may also include a preliminary hydrotreating stage. When either hydrotreating or hydrocracking is used for substantial sulfur removal, a gas-liquid separator may be used to remove gas phase contaminants from the liquid effluent at one or more locations within the process flow.

Hydrotreatment is typically used to reduce the sulfur, nitrogen, and aromatic content of a feed and/or to improve the viscosity index of a hydrotreated product. Hydrotreating conditions can include temperatures of 200° C. to 450° C., or 315° C. to 425° C.; pressures of 250 psig (1.8 MPa) to 5000 psig (34.6 MPa) or 300 psig (2.1 MPa) to 3000 psig (20.8 MPa); Liquid Hourly Space Velocities (LHSV) of 0.2-10 h$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$). Although hydrotreatment is often performed for sulfur and/or nitrogen removal, in some aspects, hydrotreatment can be performed under what could be considered as "sweet" conditions, or alternatively "non-sour" conditions, where the sulfur content of the feed entering the hydrotreatment stage can be 500 wppm or less, or 200 wppm or less. Hydrotreatment in a non-sour and/or sweet stage can still be effective for reducing the amount of sulfur, nitrogen, and/or aroamtics in a feed. The hydrotreating conditions noted above can be effective for hydrotreatment under sweet conditions or non-sour conditions, although the conditions may tend to have lower severity than hydrotreatment conditions for a comparable boiling range feed with a higher sulfur content.

Hydrotreating catalysts are typically those containing Group VIB metals, such as molybdenum and/or tungsten, and non-noble Group VIII metals, such as, iron, cobalt and nickel and mixtures thereof. These metals or mixtures of metals are typically present as oxides or sulfides on refractory metal oxide supports. Suitable metal oxide supports include low acidic oxides such as silica, alumina or titania. Preferred aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. The supports are preferably not promoted with a halogen such as fluorine as this generally increases the acidity of the support. Preferred metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina. Alternatively, the hydrotreating catalyst can be a bulk metal catalyst, or a combination of stacked beds of supported and bulk metal catalyst.

Hydrocracking catalysts typically contain sulfided base metals on acidic supports, such as amorphous silica alumina, cracking acidic zeolites such as USY, or acidified alumina. Often these acidic supports are mixed or bound with other metal oxides such as alumina, titania or silica. Non-limiting examples of metals for hydrocracking catalysts include nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In aspects where a hydrocracking catalyst includes Group VIII noble metals, such as for hydrocracking in a "sweet" hydrocracking stage, the one or more Group VIII metals can be present in an amount ranging from 0.1 wt % to 5.0 wt %, or 0.1 wt % to 2.0 wt %, or 0.3 wt % to 2.0 wt %, or 0.1 wt % to 1.5 wt %, or 0.3 wt % to 1.5 wt %. In aspects where a hydrocracking catalyst includes base metals, the at least one Group VIII non-noble metal, in oxide form, can typically be present in an amount ranging from 2 wt % to 40 wt %, preferably from 4 wt % to 15 wt %. The at least one Group VIB metal, in oxide form, can typically be present in an amount ranging from 2 wt % to 70 wt %, preferably for supported catalysts from 6 wt % to 40 wt % or from 10 wt % to 30 wt %. These weight percents are based on the total weight of the catalyst. In some aspects, suitable hydrocracking catalysts can include nickel/molybdenum, nickel/tungsten, or nickel/molybdenum/tungsten as metals supported on the hydrocracking catalyst.

In some aspects, a hydrocracking catalyst can include a large pore molecular sieve that is selective for cracking of branched hydrocarbons and/or cyclic hydrocarbons. Zeolite Y, such as ultrastable zeolite Y (USY) is an example of a zeolite molecular sieve that is selective for cracking of branched hydrocarbons and cyclic hydrocarbons. Depending on the aspect, the silica to alumina ratio in a USY zeolite can be at least 10, such as at least 15, or at least 25, or at least 50, or at least 100. Depending on the aspect, the unit cell size for a USY zeolite can be 24.50 Angstroms or less, such as 24.45 Angstroms or less, or 24.40 Angstroms or less, or 24.35 Angstroms or less, such as 24.30 Angstroms (or less). In other aspects, a variety of other types of molecular sieves can be used in a hydrocracking catalyst, such as zeolite Beta, MCM-68, and ZSM-5. Still other types of suitable molecular sieves can include molecular sieves having 10-member ring pore channels or 12-member ring pore channels. Examples of molecular sieves having 10-member ring pore channels or 12-member ring pore channels include molecular sieves having zeolite framework structures selected from MRE, MTT, EUO, AEL, AFO, SFF, STF, TON, OSI, ATO, GON, MTW, SFE, SSY, or VET.

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of a fuels hydrocracker, lubes hydrocracker, or other reaction system that is used to hydroprocess the lower boiling portion of the feed from the vacuum distillation unit. Suitable amounts of conversion of molecules boiling above 700° F. to molecules boiling below 700° F. include converting at least 5 wt % of the 700° F.+ portion of the feedstock to the stage(s) of the reaction system, or at least 15 wt %, or at least 25 wt %, or at least 35 wt %, or at least 45 wt %, or at least 55 wt %, or at least 65 wt %, or at least 75 wt %. It is noted that for a stage operating under sour conditions, the conversion of the 700° F.+ (371° C.) portion can be at least 15 wt %, or at least 25 wt %, or at least 35 wt %, or at least 45 wt %, or at least 55 wt %, or at least 65 wt %, or at least 75 wt %. Additionally or alternately, the amount of conversion for the reaction system can be 85% or less, or 80% or less, or 75% or less, or 70% or less. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a fuels hydrocracking reaction system, lubricant base oil production reaction system, or other reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various embodiments, the conditions selected for hydrocracking for lubricant base oil production can depend on the desired level of conversion, the level of contaminants in the input feed to the hydrocracking stage, and potentially other factors. For a hydrocracking process performed under sour conditions, such as conditions where the sulfur content of the input feed to the hydrocracking stage is at least 500 wppm, can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), liquid hourly space velocities of from 0.2 h$^{-1}$ to 2 h$^{-1}$ and hydrogen treat gas rates of from 213 m$^3$/m$^3$ to 1068 m$^3$/m$^3$ (1200 SCF/B to 6000 SCF/B).

In other aspects, the conditions selected for hydrocracking for fuels hydrocracking and/or lubricant base oil production can depend on the desired level of conversion, the level of contaminants in the input feed to the hydrocracking stage, and potentially other factors. For example, hydrocracking conditions in the first stage and/or the second stage can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B). The LHSV relative to only the hydrocracking catalyst can be from 0.25 h$^{-1}$ to 50 h$^{-1}$, such as from 0.5 h$^{-1}$ to 20 h$^{-1}$, and preferably from 1.0 h$^{-1}$ to 4.0 h$^{-1}$ In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less.

Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process performed under non-sour conditions can be performed under conditions similar to those used for sour conditions, or the conditions can be different. Alternatively, a non-sour hydrocracking stage can have less severe conditions than a similar hydrocracking stage operating under sour conditions. Suitable hydrocracking conditions can include temperatures of 450° F. (232° C.) to 840° F. (449° C.), or 450° F. (232° C.) to 800° F. (427° C.), or 450° F. (249° C.) to 750° F. (399° C.), or 500° F. (260° C.) to 840° F. (449° C.), or 500° F. (260° C.) to 800° F. (427° C.), or 500° F. (260° C.) to 750° F. (399° C.); hydrogen partial pressures of from 250 psig to 5000 psig (1.8 MPag to 34.6 MPag); liquid hourly space velocities of from 0.05 $h^{-1}$ to 10 $h^{-1}$; and hydrogen treat gas rates of from 35.6 $m^3/m^3$ to 1781 $m^3/m^3$ (200 SCF/B to 10,000 SCF/B). In other embodiments, the conditions can include temperatures in the range of 500° F. (260° C.) to 815° F. (435° C.), or 500° F. (260° C.) to 750° F. (399° C.), or 500° F. (260° C.) to 700° C. (371° C.); hydrogen partial pressures of from 500 psig to 3000 psig (3.5 MPag-20.9 MPag); liquid hourly space velocities of from 0.2 $h^{-1}$ to 5 $h^{-1}$; and hydrogen treat gas rates of from 213 $m^3/m^3$ to 1068 $m^3/m^3$ (1200 SCF/B to 6000 SCF/B).

In some aspects, multiple hydrocracking stages may be present, with a first hydrocracking stage operating under sour conditions, while a second hydrocracking stage operates under non-sour conditions and/or under conditions where the sulfur level is substantially reduced relative to the first hydrocracking stage. In such embodiments, the temperature in the second stage hydrocracking process can be 40° F. (22° C.) less than the temperature for a hydrocracking process in the first stage, or 80° F. (44° C.) less, or 120° F. (66° C.) less. The pressure for the second stage hydrocracking process can be 100 psig (690 kPa) less than a hydrocracking process in the first stage, or 200 psig (1380 kPa) less, or 300 psig (2070 kPa) less.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In some embodiments, a dewaxing catalyst is also included as part of the process train that generates the input feed. Typically, the dewaxing catalyst is located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst.

Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Other molecular sieves that are isostructural with the above materials include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the disclosure are catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, or 60:1 to 110:1, or 70:1 to 100:1.

In various embodiments, the catalysts according to the disclosure can further include a metal hydrogenation component. The metal hydrogenation component is typically a Group VI and/or a Group VIII metal. Preferably, the metal hydrogenation component is a Group VIII noble metal. Preferably, the metal hydrogenation component is Pt, Pd, or a mixture thereof. In an alternative preferred embodiment, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the disclosure can also include a binder. In some optional embodiments, the dewaxing catalysts used in process according to the disclosure can be formulated using a low surface area binder, a low surface area binder represents a binder with a surface area of 100 m$^2$/g or less, or 80 m$^2$/g or less, or 70 m$^2$/g or less.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Process conditions in a catalytic dewaxing zone can include a temperature of from 200 to 450° C., preferably 270 to 400° C., a hydrogen partial pressure of from 1.8 to 34.6 MPag (250 to 5000 psi), preferably 4.8 to 20.8 MPag, a liquid hourly space velocity of from 0.2 to 10 v/v/hr, preferably 0.5 to 3.0, and a hydrogen circulation rate of from 35.6 to 1781 m$^3$/m$^3$ (200 to 10,000 scf/B), preferably 178 to 890.6 m$^3$/m$^3$ (1000 to 5000 scf/B). In still other aspects, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B).

In yet other aspects where the hydrogen partial pressure during catalytic dewaxing is lower than the hydrogen partial pressure during hydrofinishing, the hydrogen partial pressure during catalytic dewaxing can be 10.3 MPag or less, or 8.0 MPag or less, or 6.9 MPag or less, or 5.0 MPag or less, or 3.5 MPag or less, or 2.8 MPag or less, and optionally as low as about 1.8 MPag or lower.

In addition to the aromatic saturation catalyst described above, in some aspects multiple aromatic saturation/hydrofinishing zones may be present within a process flow and/or multiple aromatic saturation catalysts may be present within a single aromatic saturation process. In such aspects, other types of hydrofinishing or aromatic saturation catalysts may also be used in a process flow.

When other types of hydrofinishing or aromatic saturation catalysts are present, one option for a hydrofinishing catalyst can be a catalyst that includes Pt, Pd, or a combination thereof on a non-acidic support such as alumina, silica, and/or titania. This includes conventional hydrotreating catalysts with Pt or Pd supported on alumina. With regard to conventional hydrofinishing catalysts, a hydrofinishing catalyst can include from 0.1 wt % to 5.0 wt % of hydrogenation metal relative to the weight of the support. Due to the low acidity support, this type of catalyst causes little or no cracking of feed while being effective for reduction of single ring aromatics. However, this type of catalyst tends to deactivate rapidly, resulting in frequent reactor shut down operations to allow for catalyst skimming and/or change out.

Another suitable type of hydrofinishing catalyst can be a catalyst based on the M41S family of catalyst supports, such as MCM-41, MCM-48, or MCM-50. In some aspects, an aromatic saturation (hydrofinishing) catalyst can comprise, consist essentially of, or be a Group VIII and/or Group VIB metal on a support material, e.g., an amorphous support such as a bound support from the M41S family, for instance bound MCM-41. The M41S family of catalysts can be described as mesoporous materials having relatively high silica contents, e.g., whose preparation is further described in *J. Amer. Chem. Soc.*, 1992, 114, 10834. Examples of M41S materials can include, but are not limited to MCM-41, MCM-48, MCM-50, and combinations thereof. Mesoporous materials can be understood to refer to catalysts having pore sizes from 15 Angstroms to 100 Angstroms. A preferred member of this class is MCM-41, whose preparation is described, e.g., in U.S. Pat. No. 5,098,684. MCM-41 is an inorganic, porous, non-layered phase having a hexagonal arrangement of uniformly-sized pores. The physical structure of MCM-41 is similar to a bundle of straws, in which the opening of the straws (the cell diameter of the pores) ranges from 15-100 Angstroms. MCM-48 has a cubic symmetry and is described, for example, in U.S. Pat. No. 5,198,203. MCM-50 has a lamellar structure.

MCM-41 can be made with different size pore openings in the mesoporous range. Preferably, an MCM-41 catalyst can have an average pore size of 40 angstroms or less, such as 25 angstroms or less. The content of framework molecules in an MCM-41 catalyst can also vary. The framework of the MCM-41 can include silica, in combination with alumina, titania, or zirconia. The ratio of silica to alumina, titania, or zirconia in the framework can vary from as high as 800:1 to as little as 25:1.

If binders are desired to be used, suitable binders for the M41S family, and specifically for MCM-41, can include alumina, silica, titania, silica-aluminas, or a combination thereof. With some types of binders, relatively high specific surface areas are possible with MCM-41 type catalysts, such as catalyst surface areas of at least 600 m$^2$/g, or at least 750 m$^2$/g, or at least 850 m$^2$/g, or at least 950 m$^2$/g. Preferably, binders providing a lower surface area can be selected, such as binders that provide a catalyst surface area of 650 m$^2$/g or less, or 550 m$^2$/g or less. Low surface area alumina or titania binders are options for producing a MCM-41 type catalyst with a reduced surface area.

One example of a suitable aromatic saturation catalyst is an alumina-bound mesoporous MCM-41 with a supported hydrogenation metal thereon/therein, e.g., Pt, Pd, another Group VIII metal, a Group VIB metal, or a mixture thereof. Individual hydrogenation metal embodiments can include, but are not limited to, Pt only or Pd only, while mixed hydrogenation metal embodiments can include, but are not limited to, combinations of Pt and Pd. When present, the amount of Group VIII hydrogenation metal(s) can be at least 0.1 wt % based on the total weight of the catalyst, for example at least 0.5 wt % or at least 0.6 wt %. Additionally or alternately, the amount of Group VIII hydrogenation metal(s) can be 5.0 wt % or less based on the total weight of the catalyst, for example 3.5 wt % or less, or 2.5 wt % or less, or 1.5 wt % or less, or 1.0 wt % or less, or 0.9 wt % or less, or 0.75 wt % or less, or 0.6 wt % or less. Further additionally or alternately, the total amount of hydrogenation metal(s) can be at least 0.1 wt % based on the total weight of the catalyst, for example at least 0.25 wt %, or at least 0.5 wt %, or at least 0.6 wt %, or at least 0.75 wt %, or at least 1 wt %. Still further additionally or alternately, the total amount of hydrogenation metal(s) can be 35 wt % or less based on the total weight of the catalyst, for example 30 wt % or less, or 25 wt % or less, or 20 wt % or less, or 15 wt % or less, or 10 wt % or less, or 5 wt % or less.

In some aspects, an aromatic saturation process can optionally include multiple beds and/or stages of hydrofinishing catalyst. The multiple beds or stages can be organized in a single reactor or in a plurality of reactors. An alumina-modified aromatic saturation catalyst based on a silica support as described above can be present in at least one hydrofinishing catalyst bed, in at least one hydrofinishing stage, in a plurality of hydrofinishing catalyst beds, in a plurality hydrofinishing stages, or a combination thereof.

Hydrogenation or aromatic saturation conditions can include temperatures from about 25° C. to about 425° C., such as about 75° C. to about 425° C., or about 100° C. to about 425° C., or about 200° C. to about 350° C., or about 220° C. to about 320° C., or about 180° C. to about 280° C.; a hydrogen partial pressure from about 100 psig (0.7 MPa) to about 3000 psig (20.7 MPa), preferably about 500 psig (3.4 MPa) to about 2500 psig (17.2 MPa); and a liquid hourly space velocity from about 0.1 $hr^{-1}$ to about 5.0 $hr^{-1}$ LHSV, preferably about 0.5 $hr^{-1}$ to about 2.5 $hr^{-1}$. Additionally, a hydrogen treat gas rate of from about 35.6 $m^3/m^3$ to about 1781 $m^3/m^3$ (200 SCF/B to 10,000 SCF/B) can be used.

In some optional aspects, it may desirable to perform a final hydrofinishing process at an elevated pressure. The elevated pressure may refer to a hydrofinishing process having a hydrogen partial pressure greater than 2000 psig (~13.8 MPag), or the elevated pressure may refer to a total pressure and/or hydrogen partial pressure that is greater than a pressure in a prior catalytic dewaxing stage.

During high pressure hydrofinishing, a lubricant boiling range fraction can be exposed to a hydrofinishing catalyst under hydrofinishing conditions that include a hydrogen partial pressure of greater than 2000 psig (~13.8 MPa), or greater than 2500 psig (~17.2 MPa), or greater than 2600 psig (~18.0 MPa), or greater than 3000 psig (~20.6 MPa), or at least 3200 psig (~22.1 MPa), or at least 3400 psig (~23.4 MPa), or at least 3500 psig (24.1 MPa) such as up to 5000 psig (34.5 MPa) or more. This can correspond to a total pressure for the hydrofinishing conditions of greater than 2000 psig (~13.8 MPa), or greater than 2500 psig (~17.2 MPa), or greater than 2600 psig (~18.0 MPa), or greater than 3000 psig (~20.6 MPa), or at least 3200 psig (~22.1 MPa), or at least 3400 psig (~23.4 MPa), or at least 3500 psig (24.1 MPa) such as up to 5000 psig (34.5 MPa) or more. More generally, the hydrogen partial pressure and/or the total pressure during hydrofinishing under hydrofinishing conditions can be from 500 psig (~3.5 MPa) to about 5000 psig (~24.1 MPa), or at least 1000 psig (~6.9 MPa), or at least 1500 psig (~10.3 MPa).

Additionally or alternately, the total pressure and/or the hydrogen partial pressure during hydrofinishing can be greater than, or possibly substantially higher than, the pressure in a catalytic dewaxing stage and/or other hydroprocessing stages used to form the hydroprocessed effluent. In some aspects, the total pressure and/or hydrogen partial pressure during high pressure hydrofinishing can be at least 250 psi (~1.7 MPa) greater than the hydrogen partial pressure of a catalytic dewaxing stage and/or any hydroprocessing stage of the hydroprocessing that was performed to form the hydroprocessed effluent, or at least 500 psi (~3.5 MPa) greater, or at least 800 psi (~5.5 MPa) greater, or at least 1000 psi (~6.9 MPa) greater, or at least 1200 psi (~8.3 MPa) greater, or at least 1500 psi (~10.3 MPa) greater, or at least 2000 psi (~13.8 MPa) greater.

During high pressure hydrofinishing, the hydrofinishing conditions can also include a temperature of 200° C. to 360° C., or 220° C. to 340° C. Process conditions other than temperature and pressure can include a liquid hourly space velocity of from 0.2 $hr^{-1}$ to 10 $hr^{-1}$, or 0.5 $hr^{-1}$ to 5.0 $hr^{-1}$, and a hydrogen treat gas rate of from 35.6 $m^3/m^3$ to 1781 $m^3/m^3$ (200 scf/B to 10,000 scf/B), or 178 $m^3/m^3$ to 890.6 $m^3/m^3$ (1000 scf/B to 5000 scf/B).

It is noted that the catalyst corresponding to a noble metal (or metals) on an alumina-modified silica support described herein may be used as the hydrofinishing catalyst in a high pressure hydrofinishing process.

Sample Configuration—Lubricant Base Oil Production

Figure 10:
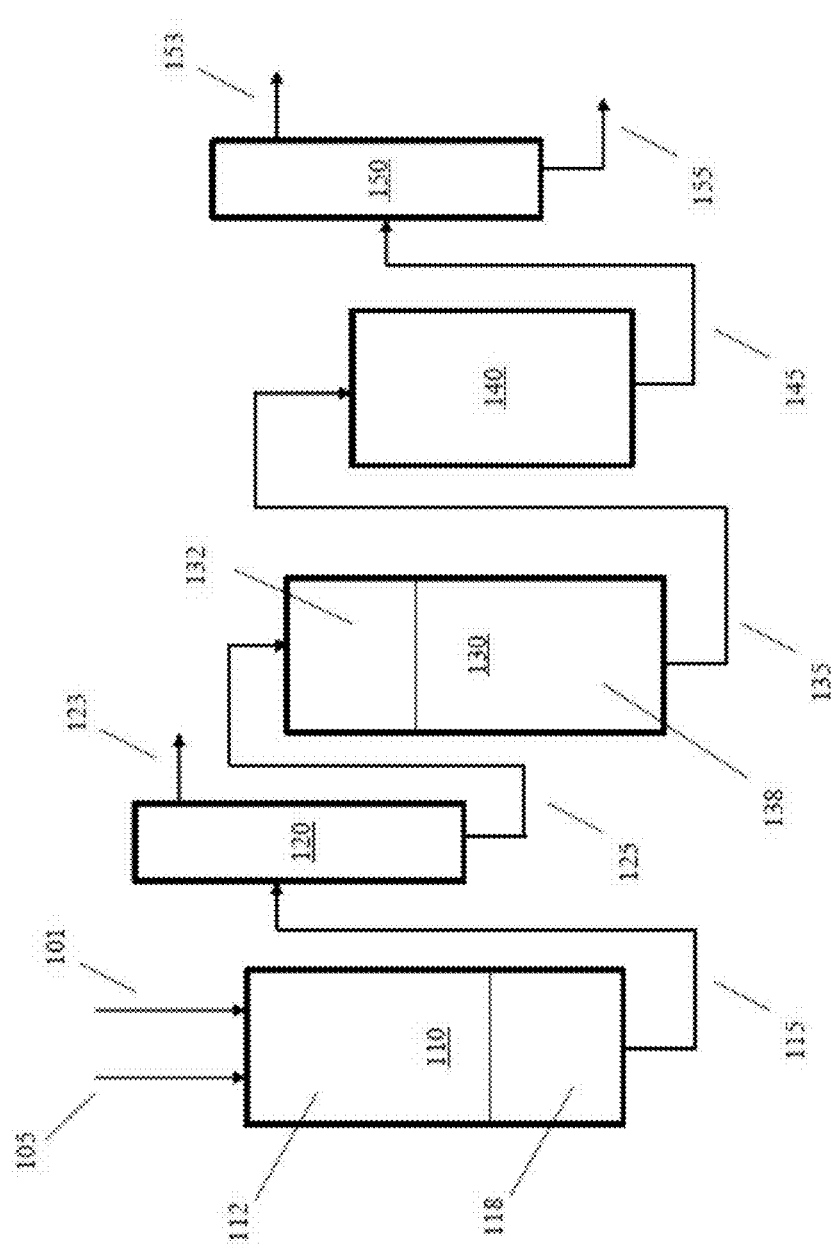
FIG. 10 schematically shows an example of a process flow for lubricant base oil production that includes a plurality of aromatic saturation and/or hydrofinishing processes.

FIG. 10 shows an example of a reaction system suitable for production of lubricant base oils. In FIG. 10, a feed 105 that includes a lubricant boiling range portion is introduced into a first hydroprocessing reactor 110. A hydrogen-containing gas stream 101 is also shown as being introduced into first hydroprocessing reactor 110, but it is understood that hydrogen can be introduced at any convenient location(s) within the reaction system. Also, first hydroprocessing reactor 110 is shown as a single reactor, but alternatively a plurality of first hydroprocessing reactors 110 can be used. For example, first hydroprocessing reactor 110 is shown as including hydrotreating catalyst bed(s) 112 that contains one or more hydrotreating catalysts, and hydrocracking catalyst bed(s) 118 that includes one or more hydrocracking catalysts. In alternative aspects, hydrotreating catalyst bed(s) 112 can be in a separate reactor from hydrocracking catalyst bed(s) 118. The hydroprocessed effluent 115 from first hydroprocessing reactor 110 can then be separated in a separator 120. In some aspects, separator 120 can correspond to a gas-liquid separator for removing light ends ($C_4$—) and contaminant gases (e.g., $H_2S$, $NH_3$) from the hydroprocessed effluent 115. In other aspects, separator 120 can correspond to a flash separator and/or fractionator that can allow for separation of a fuels boiling range portion 123 (naphtha and/or diesel) from a bottoms portion 125. The bottoms portion 125 can then be introduced into second hydroprocessing reactor 130. In the configuration shown in FIG. 10, second hydroprocessing reactor 130 can include aromatic saturation catalyst bed(s) 132 and dewaxing catalyst bed(s) 138, although it is understood that multiple second hydroprocessing reactors 130 may alternatively be used. Aromatic saturation catalyst bed 132 can correspond to a catalyst bed that contains (or at least partially contains) the catalyst having noble metal on an alumina-modified silica support that is described herein. The dewaxed effluent 135 from second hydroprocessing reactor 130 can then be passed into a hydrofinishing reactor 140. The hydrofinished effluent 145 can then be fractionated in a fractionator 150 (and/or separated in a separation stage) to form at least one or more fuels fractions 153 and one or more lubricant boiling range fractions 155.

EXAMPLES

The following examples provide information to illustrate various aspects of the disclosure. In the following examples, unless otherwise indicated, the catalyst is a silica supported catalyst with Pt added as a hydrogenation metal. The Pt was impregnated by incipient wetness onto a silica support available from Davison. The silica support had a surface area of about 290 $m^2/g$, a pore diameter of about 150 A, a 35-60 mesh size, and an incipient wetness pore volume of about 1.1 cc/g. In each example the Pt precursor used was a tetraammineplatinum(II) nitrate containing about 50.1% wt. of Pt. The various examples were designed as aqueous preparations. Some of the supported catalysts were prepared by dissolving the tetraammineplatinum(II) nitrate in water and adding it by incipient wetness to the silica. These catalysts were then dried at about 100° C. and calcined to different temperatures as indicated. For other catalysts, the amino acid arginine (arg) was added to the impregnation solution as a bifunctional organic dispersant. The amount of arginine added was such that the arginine to Pt mole ratio was about 8:1. The arginine was dissolved in the aqueous solution containing tetraammineplatinum(II) nitrate and this liquid was impregnated by incipient wetness onto the silica support and dried at about 100° C. These arginine impregnated catalysts were then calcined to about 425° C. to decompose the organic. For the catalysts with impregnated alumina, the alumina was added by aqueous incipient wetness impregnation of aluminum nitrate, which was then decomposed at about 375° C. Depending on the sample, alumina was added either after, during, or before the Pt addition. Thermogravimetric Differential Thermal Analysis (TG/DTA) scans at programmed heating rates of 4° C./min were used to monitor the sequential decomposition of the complexes. Oxygen chemisorption was used to measure the number of surface metal sites.

Example 1a 0.8% $Pt/SiO_2$ 0.319 g of Pt tetrammine nitrate (containing 50.1% wt. of Pt) was dissolved into deionized water to a final volume of about 22 cc and this resulting solution was added by incipient wetness to 19.84 g of a silica support. The sample was dried at 100° C. overnight and then heated according to a temperature program at 0.5° C./min to 350° C. and held at 350° C. for 4 h. The calcined sample was denoted as Pt ($H_2O$)/$SiO_2$.

Example 1b 0.8% $Pt/Al_2O_3$

A sample similar to Example 1a was prepared that used an alumina support composed of Versal 300 alumina (available from UOP) in place of the silica support. The calcined sample was denoted as $Pt/Al_2O_3$.

Example 2

0.8% $Pt/SiO_2$ with Arginine 0.319 g of Pt tetrammine nitrate (containing 50.1% wt. of Pt) and 1.143 g of arginine were dissolved in deionized water such that the total solution volume was about 22 cc. This solution was impregnated by incipient wetness onto 19.84 g of a silica support. The sample was dried at 100° C. overnight and the dried samples were calcined in a box furnace with a heating rate of 0.5° C./min to 425° C. and held at that temperature four hours. This was believed to be sufficient to substantially completely oxidize the arginine.

Example 3b 2.1% $Al_2O_3$ Impregnated on 0.8% $Pt/SiO_2$ with Arginine 2.94 g of aluminum nitrate nonahydrate was dissolved in distilled water to give a solution volume of about 22 cc. 19.6 g of the catalyst in Example 2 was impregnated by incipient wetness using the alumina nitrate solution. The sample was dried overnight at 100° C. and then heated at 0.5° C./min to 375° C. and held at that temperature for 4 hours.

Example 3a-3e

Samples similar to that described in Example 3b but with varying loadings of alumina on the catalyst were prepared. Table 1 lists the catalysts which contained 0.8% Pt on silica to which alumina in varying amounts was added by incipient wetness followed by calcination.

TABLE 1

Samples of 0.8% $Pt/SiO_2$ With Added $Al_2O_3$

| Sample # | wt % | g Al2O3 | g Pt/SiO2 | g Al nitrate |
|---|---|---|---|---|
| | For 20 g catalyst | | | |
| 3a | 1.0 | 0.20 | 19.8 | 1.47 |
| 3b | 2.1 | 0.40 | 19.6 | 2.94 |
| 3c | 3.0 | 0.60 | 19.4 | 4.42 |
| 3d | 6.8 | 1.36 | 18.6 | 10.0 |
| 3e | 16.8 | 3.36 | 16.6 | 24.7 |

Example 4

0.8% $Pt/SiO_2$ with Arginine Impregnated onto 2% $Al_2O_3/SiO_2$ Support (Reverse Sequence)

Synthesis of a catalyst similar to Sample 3b was repeated but the sequence of the addition of Pt and alumina was reversed. 2.94 g of aluminum nitrate nonahydrate was dissolved in distilled water to give a solution volume of about 22 cc. The alumina nitrate solution was impregnated by incipient wetness onto 19.6 grams of silica support. After overnight drying at 100° C., the sample was calcined at 0.5° C./min to 375° C. and held at 375° C. for four hours. 0.319 g of Pt tetrammine nitrate (containing 50.1% wt. of Pt) and 1.143 g of arginine were dissolved in deionized water such that the total solution volume was about 22 cc. This solution was impregnated by incipient wetness onto 19.84 g of the "2% $Al_2O_3$ on silica" prepared in the first step of this example, dried at 100° C. overnight and then heated at 5° C./min to 425° C. and held at that temperature for four hours. This sample is referred to herein as Sample 3b-R.

Example 5

Additional Catalyst Samples

For Sample 5a, a catalyst similar to Sample 3a was prepared, but the catalyst was prepared without the use of Arginine as an organic additive.

For Sample 5b, a catalyst was prepared according to Example 6b (see below), with 1.0 wt % added alumina.

For Samples 5c and 5d, catalysts similar to Samples 3a and 3b were prepared, but Pt was impregnated on the catalyst after deposition of the $Al_2O_3$, as opposed to impregnating with Pt prior to deposition of the $Al_2O_3$.

For Sample 5e, a catalyst was prepared according to Example 6e (see below) with 1.0 wt % of added alumina.

For Sample 5f, a catalyst similar to Sample 3a was prepared, but Pt was impregnated at the same time as deposition of the $Al_2O_3$.

For Samples 5g and 5h, a catalyst was prepared according to Example 6g (see below). Sample 5g had 1.0 wt % added alumina, while Sample 5h had 2.0 wt % added alumina.

Examples 6a-6i

Pt—Pd Alloy Series on Silica

For Examples 6a-6i, the steps in example 2 were followed, but with co-mixing of the 50.10% Pt_tetrammine nitrate solution with a tetraammine Pd nitrate solution of 8.5% Pd content in varying amounts. The solutions were used to impregnate about 19.9 g of silica support by incipient wetness. The arginine to total (Pt+Pd) molar ratio was kept at about 8:1 and all the samples had about the same molar content of (Pt+Pd). This corresponded to having about 1.14 g of arginine on the catalyst support prior to calcination. All calcinations were performed in a manner similar to example 2. FIG. 1 provides the details for the Pt—Pd/SiO$_2$ catalysts (optionally with alumina modification) that were made using this procedure.

Example 7

0.8% Pt+1% Al$_2$O$_3$ Co-Impregnated onto SiO$_2$ with Arginine

A catalyst similar to sample 3a was prepared except that the alumina and platinum precursors were commixed and coimpregnated. The arginine content was maintained at 8:1 moles arginine/moles Pt. In this preparation, 0.74 g of aluminum nitrate, 0.16 g of Pt tetraammine nitrate (containing 50.1% wt. of Pt) solution, and 0.57g of arginine were mixed into an aqueous solution of water adjusted to 10 cc. This was impregnated in a single step onto 9.9 g of silica. The dried sample was calcined in a box furnace with a heating rate of 0.5 deg/min to 425° C. and held at that temperature four hours.

Example 8

Silica-Alumina Comparative Catalysts

Comparative Samples 8a and 8b were composed of Pt supported on a commercially available amorphous silica-alumina support obtained from Grace Davison (75% wt. SiO$_2$ and 25% wt. Al$_2$O$_3$). For Sample 8a, Pt was impregnated on to the silica-alumina support in a manner similar to sample 1 (aqueous preparation using tetrammine Pt nitrate).

Sample 8b contained 1.7 wt % Pt was prepared by the method of selective electrostatic adsorption. In the preparation of sample 10c, 2.25 g of a 7.33% solution of tetrammine Pt hydroxide was diluted with water to make a total solution volume of about 100 cc. The resulting pH of the solution was 11.4. 10 g of the SiO$_2$—Al$_2$O$_3$ support material was suspended in the Pt solution and ammonium hydroxide was slowly added to the solution in order to maintain the pH at 10. The sample was filtered and dried overnight at 100° C. and then heated at 0.5 deg/min to 375° C. and held at that temperature for 4 hours.

Example 9

Measurement of Chemisorption Properties

Chemisorption measurements were obtained under static high vacuum conditions on a Quantachrome Autosorb 1A instrument. 0.2-0.4 g of catalyst was reduced in flowing hydrogen and heated at 2° C./min to the final reduction temperature and held at that temperature for 2 hours. Following reduction, the sample was evacuated (while still at the reduction temperature) with a turbomolecular pump for 30 minutes to remove any chemisorbed hydrogen. With the sample still under vacuum, the temperature was lowered to 40° C. and held isothermal during subsequent treatments. An 8-point isotherm (with pressures between 80 and 400 torr) was measured at 40° C. with O$_2$ as the adsorbent molecule. The weak (or back) O isotherms reflected near zero oxygen uptake on the support and near zero multiple layer oxygen on the metals.

Figure 3:
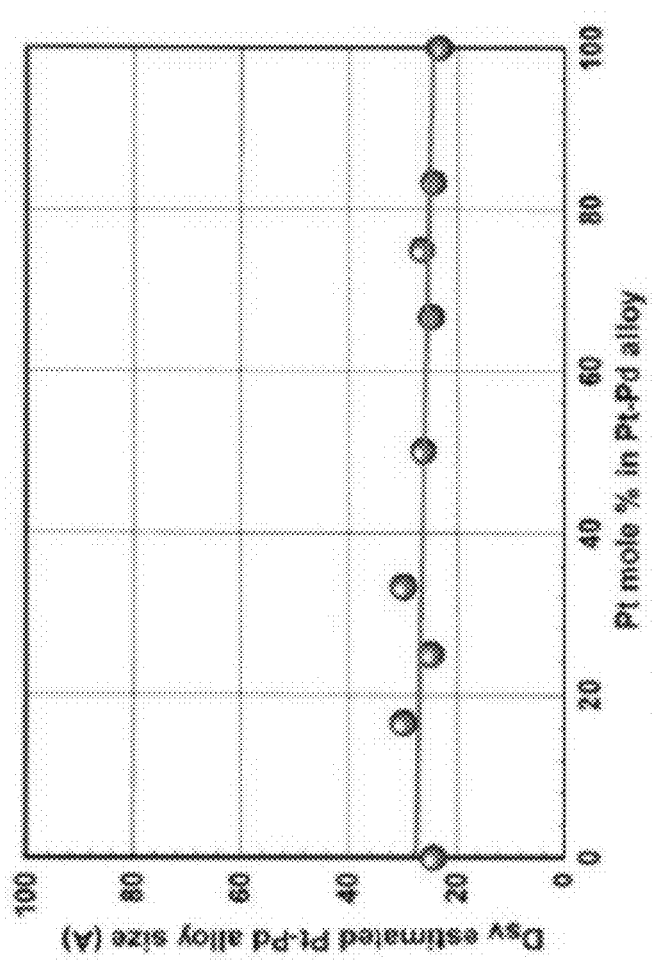
FIG. 3 shows calculated particle size values for various hydrogenation catalysts.

The oxygen chemisorption values of the catalysts that were prepared according to Example 6 were measured and the results are shown in FIG. 2. The plot shown in FIG. 2 represents a percentage of metal dispersion, as the amount of O that is chemisorbed is believed to be proportional to the amount of surface Pt and Pd adsorption sites. The calculated metal particles sizes for the catalysts that were prepared in Example 6 are shown in FIG. 3. It is noted that the metal particle sizes were similar in all the samples and range from 2.5 to 3 nm. Chemisorption data was also collected for other samples. The metal dispersion values for the additional samples are shown in Table 2. It is noted that in Table 2, the amount of Pt or Pd supported on the catalysts is about 0.8 wt % for all samples except for 8a (1 wt % Pt), and 8b (1.7 wt % Pt).

TABLE 2

Metal Dispersion Values

| Sample # | Catalyst Description | % Metal Dispersion |
|---|---|---|
| 2 | Pt(Arg)/SiO$_2$ Arginine prep. | 52.1 |
| 2 repeat | Pt(Arg)/SiO$_2$ Arginine prep. repeat | 44.9 |
| 1a | Pt(H$_2$O)/SiO$_2$ Aqueous prep. | 39.7 |
| 1b | Pt/Al$_2$O$_3$ Aqueous prep. | 33.1 |
| 3a | Pt(Arg)/SiO$_2$ + 1.0% Al$_2$O$_3$ post impreg | 40.6 |
| 3b | Pt(Arg)/SiO$_2$ + 2.1% Al$_2$O$_3$ post impreg | 43.3 |
| 3c | Pt(Arg)/SiO$_2$ + 3.0% Al$_2$O$_3$ post impreg | 37.0 |
| 3d | Pt(Arg)/SiO$_2$ + 6.8% Al$_2$O$_3$ post impreg | 43.4 |
| 3e | Pt(Arg)/SiO$_2$ + 16.8% Al$_2$O$_3$ post impreg | 41.7 |
| 8a | Pt(Arg)/amorphous Silica-Alumina (75-25) | 30.9 |
| 8b | Pt/Amorphous Silica-Alumina (75-25) selective electrostatic adsorption | 56.1 |
| 5a | Pt(H$_2$O)/SiO$_2$ + 1.0% Al$_2$O$_3$ post impreg | 32.7 |
| 5c | Pt(Arg)/1% Al$_2$O$_3$ IW/SiO$_2$ (Pt added to Al/Si) | 33.6 |
| 5d | Pt(Arg)/2% Al$_2$O$_3$ IW/SiO$_2$ (Pt added to Al/Si) | 34.5 |
| 5f | (1% Al$_2$O$_3$ + Pt(Arg)) on SiO$_2$ coimpregnation | 28.4 |
| 6g | 5Pd:1Pt(Arg) | 38.2 |
| 5g | 2.0% Al$_2$O$_3$/5Pd:1Pt(Arg) | 19.2 |
| 6b | Pd(Arg) | 46.6 |
| 5b | 1.0% Al$_2$O$_3$/Pd(Arg) | 21.3 |
| 6e | 1Pd:5Pt(Arg) | 45.3 |
| 5e | 1.0% Al$_2$O$_3$/1Pd:5Pt(Arg) | 36.2 |

Based on the data in Table 2, it appears that for Pt on silica, there is not an appreciable effect on the chemisorption values with the addition of the alumina by impregnation. The highest dispersed sample on silica-alumina was obtained on the sample prepared by selective electrostatic adsorption (sample 8b). For Pd on silica, it appears that the chemisorption values are impacted by the addition of alumina, as shown by the strong difference in chemisorption values for samples 5g (5:1 Pd to Pt) and 5b (all Pd). For sample 5e with a lower amount of Pd (1:5 Pd to Pt), addition of alumina produced a more modest reduction in metal dispersion.

Example 10

2-methylpent-2-ene Acidity Test

A variety of samples were evaluated for acidity using a 2-methylpent-2-ene (2MP2) isomerization test. The formation rates and rate ratios of the product hexene isomers of this test reaction reflect the relative acid site concentrations. The product hexene isomers formed include 4-methylpent-2-ene (4MP2), t-3-methylpent-2-ene (t-3MP2), and 2,3 dimethylbute-2-ene (2,3 DMB2). 4MP2 requires only a double bond shift, a reaction occurring on weak acid sites. 3MP2 requires a methyl group shift (i.e., a stronger acidity requirement than double bond shift), whereas the double branched 2,3DMB2 product requires even stronger acidity. For a homologous series of solid acids, differences in t-3MP2 rates normalized with respect to 4MP2 reflect the density of acid sites possessing strengths sufficient to catalyze skeletal isomerization. The isomerization of 2-methylpent-2-ene was conducted by flowing a helium stream containing 7 mol % olefin at 101 kPa at a rate of 150 cm$^3$/min over 1 g of catalyst contained in a 22 cm$^3$ stainless-steel reactor. The reaction products were analyzed after reaction at one and two hours at 250° C., then after an additional hour at 350° C. and finally after one more hour at 250° C. Catalysts were pretreated in flowing helium for about 1 hr at 500° C. before use. Products were analyzed with an on-line Varian 3700 gas chromatograph containing a 50-m capillary column which was able to resolve all 17 hexene isomers. The capillary column was coated with SP-2100.

Figure 4:
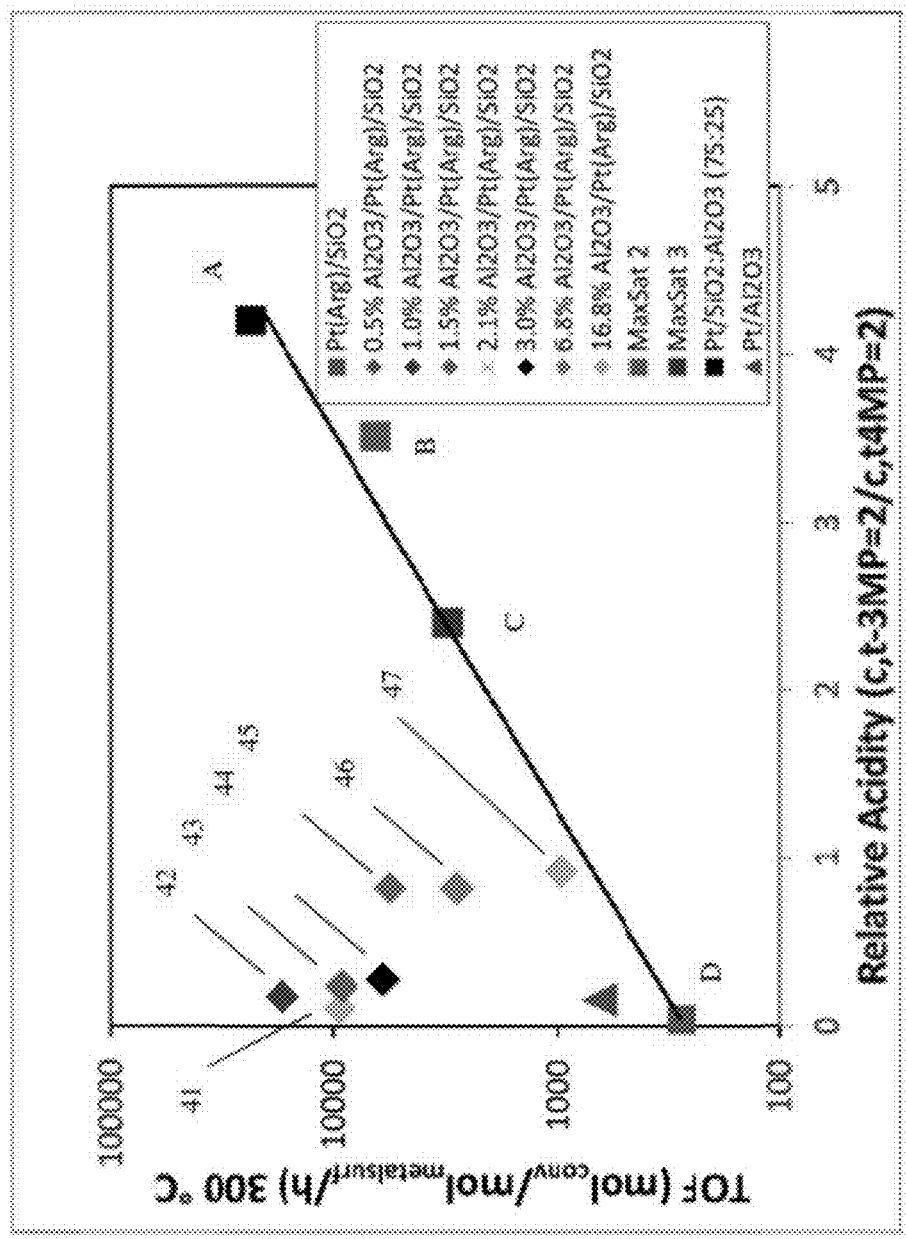
FIG. 4 shows activities for isomerization and cracking of model compounds for various hydrogenation catalysts.

FIG. 4 shows the relative acidity for various samples characterized using the 2MP2 isomerization test. The samples shown as diamonds in FIG. 4 correspond to silica-based catalysts with various amounts of alumina impregnated on the silica substrate. In FIG. 4, Diamond 41 corresponds to 0.5 wt % $Al_2O_3$; Diamond 42 corresponds to 1.0 wt % $Al_2O_3$; Diamond 43 corresponds to 1.5 wt % $Al_2O_3$; Diamond 44 corresponds to 2.1 wt % $Al_2O_3$; Diamond 45 corresponds to 3.0 wt % $Al_2O_3$; Diamond 46 corresponds to 6.8 wt % $Al_2O_3$; and Diamond 47 corresponds to 16.8 wt % $Al_2O_3$. For comparison, other types of catalysts were also characterized, including a catalyst composed of Pt on an alumina substrate (triangle symbol, similar to Example 1b); a catalyst composed of Pt on silica-alumina substrate (square symbol A, similar to Example 8); two commercially available catalysts corresponding to a combination of Pt and Pd deposited on alumina-bound MCM-41 substrates, the MCM-41 having a silica to alumina ratio of about 50:1 (square symbols B and C); and a catalyst composed of Pt on silica without any additional impregnated alumina (square symbol D).

FIG. 4 shows that addition of alumina by impregnation to the silica results in increases in the skeletal isomerization rate, with the highest relative turnover frequencies being shown at alumina amounts of about 0.5 wt % (Diamond 41) to about 3.0 wt % (Diamond 45). This rate of isomerization is increased, however, without causing a substantial increase in overall acidity. As a comparison, use of a catalyst with a silica-alumina substrate (square symbol A) provides an increase in turnover frequency, but also results in a substantial increase in the relative number of strong acid sites as indicated by the increase in the ratio of 3MP2 versus 4MP2 generated for the silica-alumina based catalyst.

It is noted that data points 41, 42, 43, and 44 correspond to alumina amounts of 0.5 wt % to 2.1 wt %. This first grouping of alumina-modified catalysts have roughly comparable acidity levels. Data points 45, 46, and 47 correspond to a second grouping of alumina-modified catalysts that have roughly comparable acidity levels, with a substantially higher acidity than the catalysts corresponding to data points 41, 42, 43, and 44. Without being bound by any particular theory, it is believed that this shift in acidity represents a transition from having a ratio of tetrahedral to octahedral aluminum atoms of greater than 1.0 (data points 41, 42, 43, and 44) to a ratio of less than 1.0 (data points 45, 46, and 47). It is believed that this shift occurs at about 2.5 wt % of alumina or less, or about 2.2 wt % of alumina or less. This distinction is explained in further detail in Example 16.

Example 11

Toluene Hydrogenation Test in Absence of Sulfur

Figure 5:
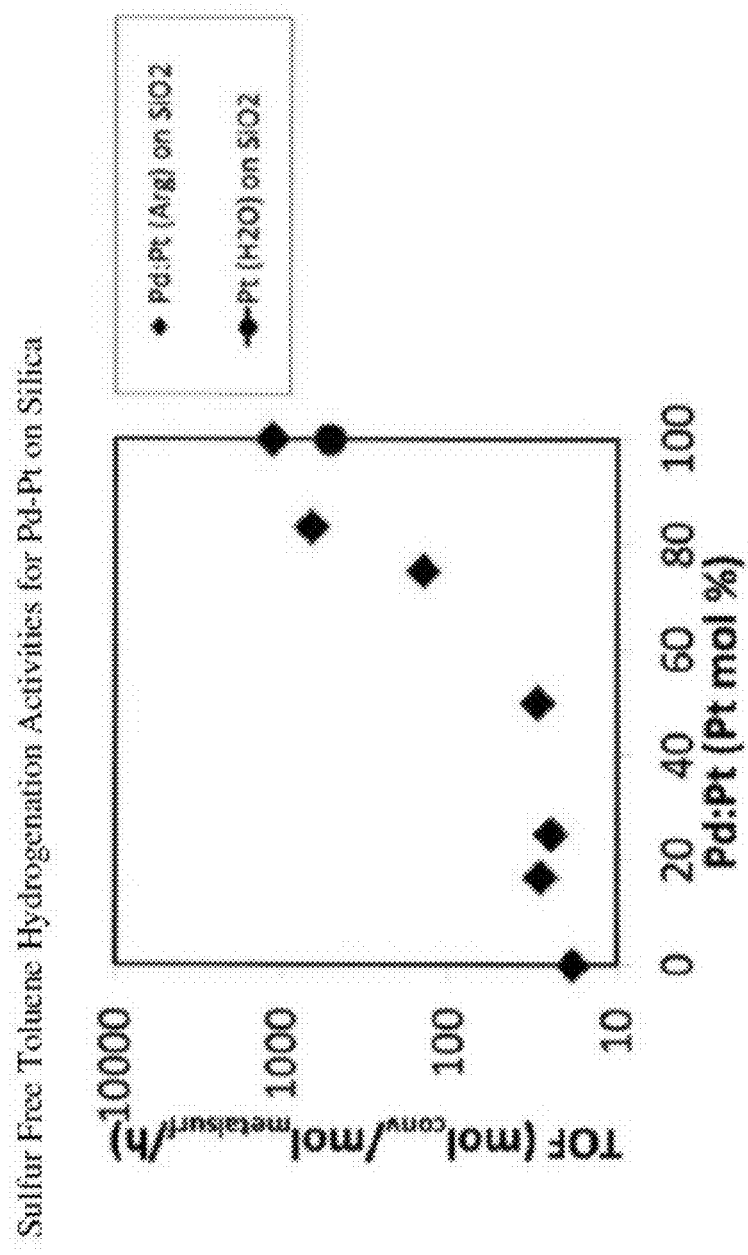
FIG. 5 shows activities for various hydrogenation catalysts in a substantially sulfur free feed.

Samples 6a-6i were evaluated for activity for toluene hydrogenation in a sulfur-free environment by measurement in a (sulfur-free) fixed bed reactor running at 10 psig of pressure. Each sample was reduced at 400° C. for 2 h in flowing $H_2$ before the activity measurements. Depending on the activity of the catalyst, the following experimental variables were adjusted within the specified ranges to provide data with <20% toluene conversion: the hydrogen to toluene ratio ($H_2$/Tol) was fixed at 18; toluene WHSV varied from 5.4 hr$^{-1}$ to 8.6 hr$^{-1}$; catalyst mass was 0.05-0.250 g; and temperature was kept in the range of 40° C.-120° C. The products were quantified using online GC analysis. The rate data was normalized by the total number of metal sites as determined by O chemisorption and expressed as turnover number (moles of toluene converted per mole of metal surface sites). FIG. 5 shows the turnover number (e.g. activity data) for the various catalysts in samples 6a-6i.

As seen in FIG. 5, the hydrogenation rate was found to increase proportionally with the Pt content when the Pt mol % was greater than 50%, but the rates were constant within experimental error when the Pt mol % was less than 50%. This suggests that the catalyst surface in the low Pt scenario was Pd-rich. As the Pt content exceeded the amount of Pt that can be accommodated in the interior of a metal crystallite, some of the Pt had to be on the surface, and the activity reflected the higher intrinsic activity of Pt. Bimetallic particles with about 50% metal dispersion and about 50 mol % Pt were able to accommodate all the Pd on the surface. In other words, for an approximately 50% dispersion value, approximately half of the metal atoms are on the surface and about half are in the bulk portion of a particle. Without being bound by any particular theory, this suggests that Pd has a stronger proclivity to populate surface sites relative to Pt, so that Pt atoms can preferentially fill surface positions until there are no more available Pd atoms. At that point, Pt atoms can populate the remaining surface positions. and only when there are no more Pd atoms to fill the surface position, do Pt atoms populate the surface. This observation is consistent with the notion that Pd-carbon bonding energy is higher than that of Pt-carbon. Based on the data in FIG. 5, without being bound by any particular theory, it also appears that there is not an electronic promotion effect of the sublayer Pt atoms on Pd.

Example 12

Toluene Hydrogenation in the Presence of S for Pd—Pt on Silica

Samples 6a-6i were evaluated for their toluene hydrogenation activity in the presence of sulfur in a fixed bed reactor. Sulfur was introduced from a 500 ppm by weight sulfur solution of dipropyldisulfide in toluene. Dipropyl disulfide reacts with hydrogen to provide propane (byproduct) and $H_2S$. The sulfur concentration in the toluene was varied (125, 250, 375, and 500 ppmw) by co-feeding a clean toluene solution from a second pump. Reactions were performed at 300 psig. The catalysts were activated at 400° C. for 3 hours in flowing $H_2$ before the activity measurements. Unless otherwise specified, the hydrogen to toluene ratio ($H_2$/Tol) was fixed at 23. Depending on the activity of the catalysts, the following experimental variables were adjusted within the specified ranges to provide data with less than about 20% toluene conversion: Toluene space velocity ($mol_{Tol}/mol_{Metal}/s$) from 0.19 to 2.3; catalyst mass=0.050-0.8 g; and temperature of 270° C.-360° C.

Figure 6:
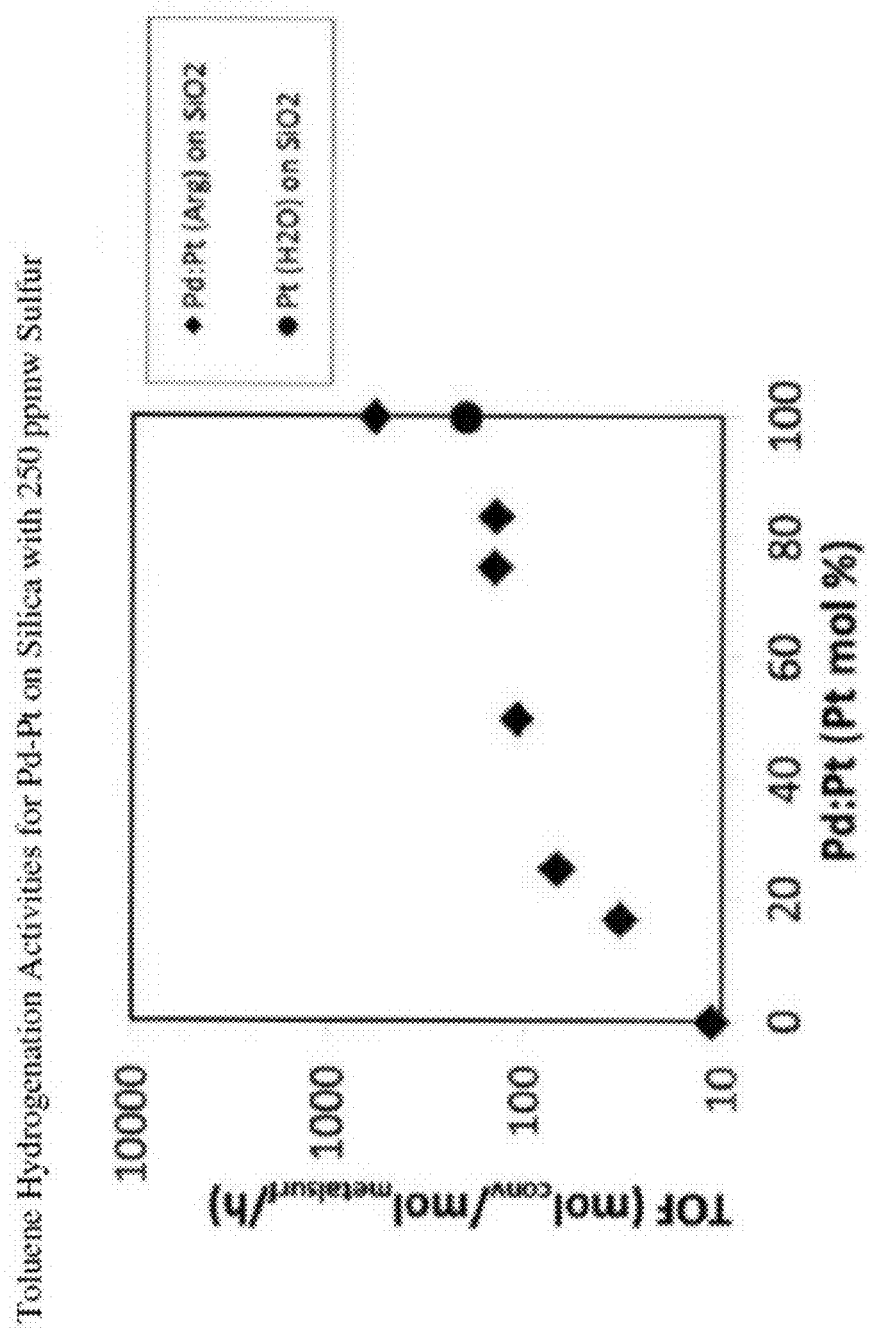
FIG. 6 shows activities for various hydrogenation catalysts in a sulfur-containing feed.

The results for the catalytic tests in the presence of sulfur revealed a similar trend to those without sulfur. The hydrogenation activity increases in going from pure Pd to pure Pt as shown in FIG. 6, which is contrary to the conventional understanding that a Pd-rich Pd:Pt bimetallic has increased activity and sulfur tolerance over Pt alone.

Example 13

Toluene Hydrogenation Test for Pt Samples

Catalysts 2, 3a, 3b, 3d, 3e, and 8b were tested for toluene hydrogenation in the presence of sulfur as described in example 12. The temperatures were adjusted to give comparable conversions where possible. The data are shown in FIG. 7 (sulfur-free feed) and FIG. 8 (feed with 250 wppm of sulfur).

Figure 7:
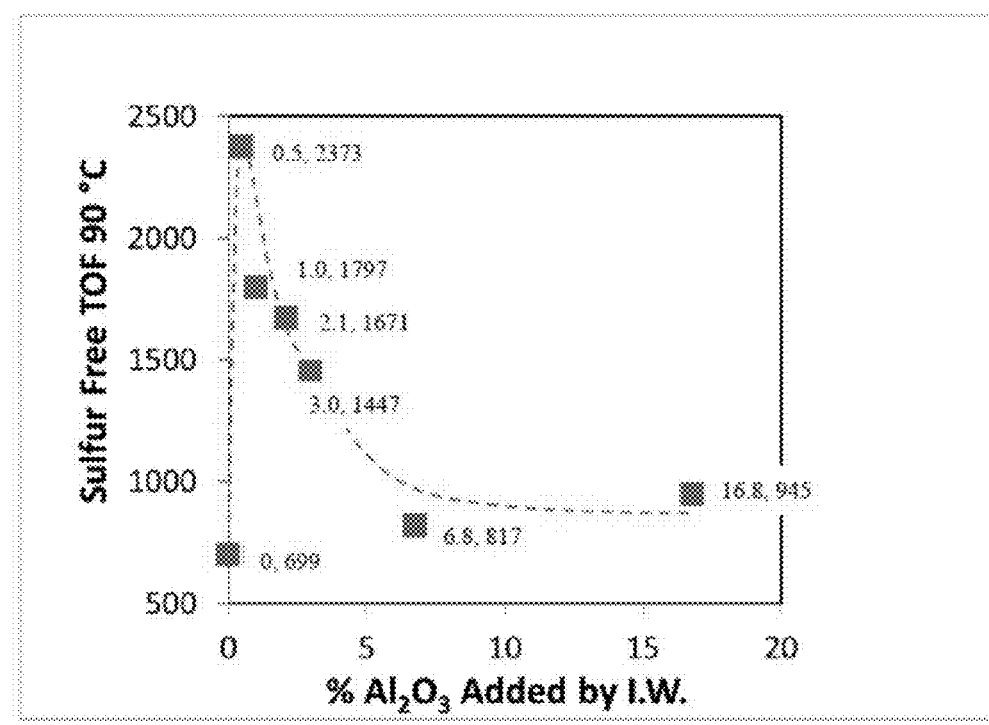
FIG. 7 shows activities for various hydrogenation catalysts relative to an alumina content for the catalysts.
Figure 8:
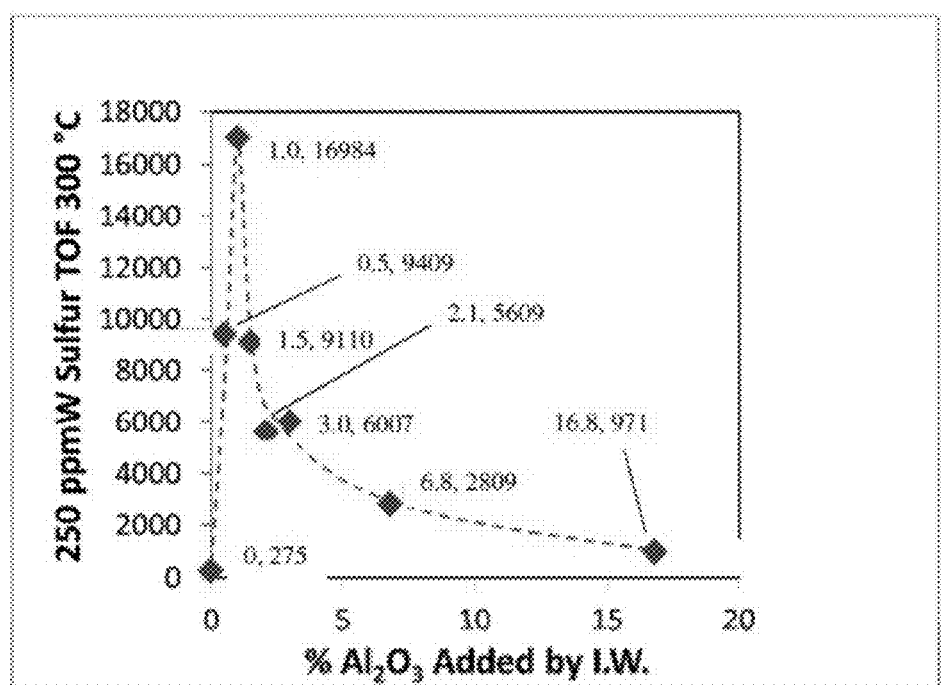
FIG. 8 show activities for various hydrogenation catalysts relative to an alumina content for the catalysts.

The data in FIGS. 7 and 8 shows that the activity per site passes through a maximum with alumina ($Al_2O_3$) additions of about 0.5 wt % to about 2.5 wt %. The location of the peak varies slightly depending on the sulfur content of the feed, with the maximum being between about 0.5 wt % to about 1.5 wt % for a sulfur-containing feed having about 250 ppmw of sulfur (FIG. 8), while the maximum is between about 0.3 wt % and about 1.0 wt % for a substantially sulfur-free feed (FIG. 7). As the amount of added alumina is further increased, the turnover frequencies approach that of catalyst with little or no added alumina. With regard to a comparison to conventional silica-alumina based catalyst, Table 3 shows that for the samples with low levels of alumina, when the conversions of toluene are adjusted to equivalent levels to the amorphous silica-alumina catalyst at similar temperatures, the cracking of the hydrogenated product (methyl cyclohexane) is reduced. In particular, the silica-based catalysts in Samples 2 and 3 result in almost no cracking, while the silica-alumina based catalyst of Sample 8b results in a noticeable amount of cracking of methyl cyclohexane.

TABLE 3

Cracking Selectivity of Toluene Hydrogenation

| | | Reaction Results | | |
|---|---|---|---|---|
| Example # | Catalyst Description | % Tol Conv | % MCH Selectivity | Temp (° C.) |
| 2 | Pt(Arg) Arginine prep. | 11.2 | 99.8 | 320 |
| 3a | 1.0% $Al_2O_3$ IW/Pt(Arg) | 53.7 | 100.0 | 300 |
| 3b | 2.1% $Al_2O_3$ IW/Pt(Arg) | 44.7 | 99.9 | 310 |
| 8b | Pt(Arg) SiAl(75-25) | 54.1 | 97.4 | 290 |

Example 14

Comparison of Toluene Hydrogenation in Catalysts

A variety of samples were tested for toluene hydrogenation as in example 12 in the presence of sulfur. The results are shown in Table 4. The data in Table 4 show that deposition of $Al_2O_3$ on catalysts including both Pd and Pt as hydrogenation metals appears to have a similar impact on activity as compared to deposition of $Al_2O_3$ on a catalyst including Pt. However, as the ratio of Pd to Pt increases, the amount of benefit of addition of the $Al_2O_3$ decreases.

TABLE 4

Toluene Hydrogenation with Pd—Pt and impregnated Al

| Example # | Catalyst Description | Temp (° C.) | Rate mol/ $mol_{cat}$/h | TOF mol/ $mol_{catsurf}$/h |
|---|---|---|---|---|
| 6g | 5Pd:1Pt(Arg) | 300 | 13 | 33 |
| 5h | 2.0% $Al_2O_3$/5Pd:1Pt(Arg) | 300 | 58 | 300 |
| 6b | Pd(Arg) | 300 | 5 | 11 |
| 5b | 1.0% $Al_2O_3$/Pd(Arg) | 300 | 12 | 58 |
| 5e | 1Pd:5Pt(Arg) | 300 | 64 | 142 |
| 6e | 1.0% $Al_2O_3$/1Pd:5Pt(Arg) | 300 | 1358 | 3751 |
| 1a | Pt($H_2O$)/$SiO_2$ Aqueous prep. | 300 | 79 | 198 |
| 5a | Pt($H_2O$)/$SiO_2$ + 1.0% $Al_2O_3$ post impreg | 301 | 1774 | 5425 |

Example 15

Impact of Variations in Deposition Sequence on Toluene Hydrogenation

Samples 3a, 3b, 3b-R, and 7 were tested for toluene hydrogenation as in example 12 in the presence of sulfur. The results of the toluene hydrogenation using samples 3a, 3b, 3b-R, and 7 are shown in FIG. 9 in comparison with the results for toluene hydrogenation using sample 2. The data in FIG. 9 appears to show that the order of deposition for Pt relative to deposition of the $Al_2O_3$ has little or no impact on the activity for a catalyst.

Example 16

Tetrahedral Versus Octahedral Aluminum Sites

As noted above, without being bound by any particular theory, it is believed that aluminum atoms in tetrahedral sites have a lower acidity than aluminum atoms in octahedral sites, with the result that having an increased ratio of aluminum atoms in tetrahedral versus octahedral coordination sites provides a catalyst with improved hydrogenation activity while reducing or minimizing any increases in cracking activity. The locations of aluminum atoms in a catalyst can be determined using $^{27}Al$ NMR.

$^{27}Al$ NMR spectra were recorded on an InfinityPlus 500 at 11.74 T, corresponding to $^{27}Al$ NMR frequencies of 130.1 MHz. The samples were loaded in MAS rotors and spun at the magic angle at rates of 12 kHz. The $^{27}Al$ MAS NMR spectra were obtained with a $\pi/12$ rad pulse length and a recycle delay of 0.3 seconds. The chemical shifts are referenced with respect to an external solution of $Al(H_2O)_6^{3+}$ for $^{27}Al$ ($\delta_{Al}$=0.0 ppm). All NMR measurements were done at room temperature. Peak assignments were made based on peaks between 70 and 40 ppm being tetrahedral, peaks between 20 and −20 ppm being octahedral, and peaks between 40 ppm and 20 ppm being penta-coordinated.

Figure 11:
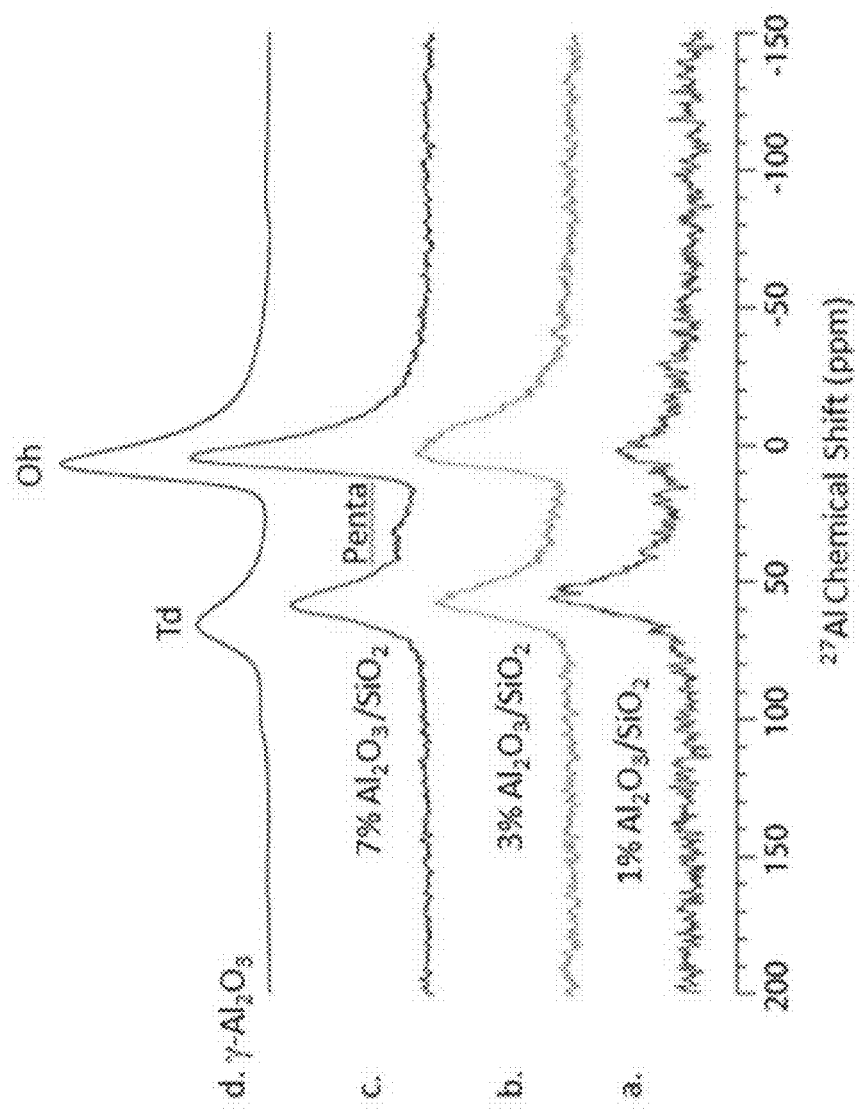
FIG. 11 shows $^{27}$Al NMR spectra for various supports.

FIG. 11 shows $^{27}Al$ NMR spectra of four different catalyst supports. Spectrum "a" (lowest offset in FIG. 11) shows the NMR spectrum for a silica support modified with 1 wt % alumina, based on impregnation as described in earlier examples. Spectrum "b" corresponds to a silica support modified with 3 wt % alumina, and spectrum "c" corresponds to a silica support modified with 7 wt % alumina. Spectrum "d" corresponds to a γ-alumina support. As shown in FIG. 11, increasing the amount of impregnated on a silica support results in a relative increase in the height of octahedrally-coordinated alumina. Based on relative peak sizes, it is noted that spectra "b" and "c" are similar to spectra "d" (γ-alumina) for ratio of tetrahedral to octahedral alumina. This similarity is further illustrated in Table 5, which shows the calculated amounts of aluminum atoms in each type of coordination site as well as the ratios of tetrahedral to octahedral alumina for each of the spectra in FIG. 11.

TABLE 5

Aluminum Coordination Sites

| Sample | Td | Penta | Oh | Td/Oh ratio |
|---|---|---|---|---|
| γ-Al$_2$O$_3$ | 32% | 0% | 68% | 0.47 |
| 7 wt % Al$_2$O$_3$/SiO$_2$ | 34% | 9% | 57% | 0.60 |
| 3 wt % Al$_2$O$_3$/SiO$_2$ | 35% | 8% | 57% | 0.61 |
| 1 wt % Al$_2$O$_3$/SiO$_2$ | 70% | 0% | 30% | 2.33 |

It is noted that the silica substrates modified with 3 wt % and 7 wt % of alumina also showed small but recognizable amounts of aluminum atoms in penta-coordinated sites, which were not observed in the γ-alumina support. These aluminum atoms in penta-coordinated sites appears to substantially correspond to the difference in the ratio of aluminum atoms coordinated in tetrahedral versus octahedral sites. In Table 5, the ratio of aluminum atoms in tetrahedral versus octahedral sites for the γ-alumina sample was 0.47, while both of the higher wt % alumina-modified silica samples had a ratio of ~0.6. By contrast, the sample with 1 wt % alumina on silica had a ratio of aluminum atoms with tetrahedral to octahedral coordination of greater than 2.0, which demonstrates the clear structural difference between the silica substrate modified with a low content of alumina relative to the silica substrates modified with larger amounts of alumina.

In addition to the above NMR studies, density functional theory calculations were also performed to investigate adsorption stabilization for aromatic compounds at silica surfaces. It was found in the density functional theory calculations that an aromatic compound had enhanced adsorption stabilization when the aromatic compound had two nearest neighbor aluminum atoms with tetrahedral coordination.

Example 17

Processing of Lubricant Boiling Range Feed

A hydrocracker bottoms feed was exposed to various aromatic saturation catalysts in order to determine catalyst activity for aromatic saturation and cracking at various conditions. Table 6 provides characterization data for the feed. With regard to aromatic content, the aromatic content of a feedstock (such as a lubricant boiling range feed) can be determined by any convenient method. ASTM D2008 provides an example of a method for correlating UV-Vis spectrometry data with a weight of aromatics in a sample. UV absorbance at 226 nm has previously been used to characterize the total aromatics content in a sample. (See, for example, U.S. Pat. No. 6,569,312.) UV absorbance at 325 nm can indicate the amount of multi-ring aromatic content in a sample.

TABLE 6

| Lubricant Boiling Range Feed Properties | |
|---|---|
| KV @ 60° C. (mm$^2$/s) | ~12.2 |
| KV @ 100° C. (mm$^2$/s) | ~4.7 |
| Viscosity Index | ~120 |
| Density @ 15° C. g/cm$^3$ | ~0.86 |
| Total Aromatics (mmol/kg) | ~569 |
| Sulfur (wppm) | ~41 |
| Nitrogen (wppm) | <10 |
| 10 wt % Distillation Pt (° C.) | 360 |
| 20 wt % (° C.) | 386 |
| 40 wt % (° C.) | 418 |
| 60 wt % (° C.) | 444 |
| 90 wt % (° C.) | 493 |
| 95 wt % (° C.) | 508 |

The feed in Table 6 was exposed to a variety of aromatic saturation catalysts at various temperatures in a pilot scale reaction unit. The hydrogen pressure during the pilot scale runs was about 2000 psig (~13.8 MPag) and the liquid hourly space velocity was 2.0 hr$^{-1}$.

Two types of reference catalysts were used in the pilot scale runs. Both reference catalysts corresponded to commercially available catalysts including a noble metal supported on an alumina support, referred to herein as Reference A and Reference B. An additional comparative catalyst corresponded to 0.8 wt % Pt supported on a commercially available silica support, which is referred to herein as silica support D. Two alumina-modified catalysts were also prepared by aluminum impregnation via incipient wetness. One alumina-modified catalyst corresponded to an alumina modified version (1 wt % Al$_2$O$_3$) of 0.8 wt % Pt on silica support D. The other alumina-modified catalyst corresponded to an alumina modified version (1 wt % Al$_2$O$_3$) of 0.8 wt % Pt on the silica support available from Davison described at the beginning of the Examples section. The Davison silica support is referred to as silica support C in this example.

Figure 12:
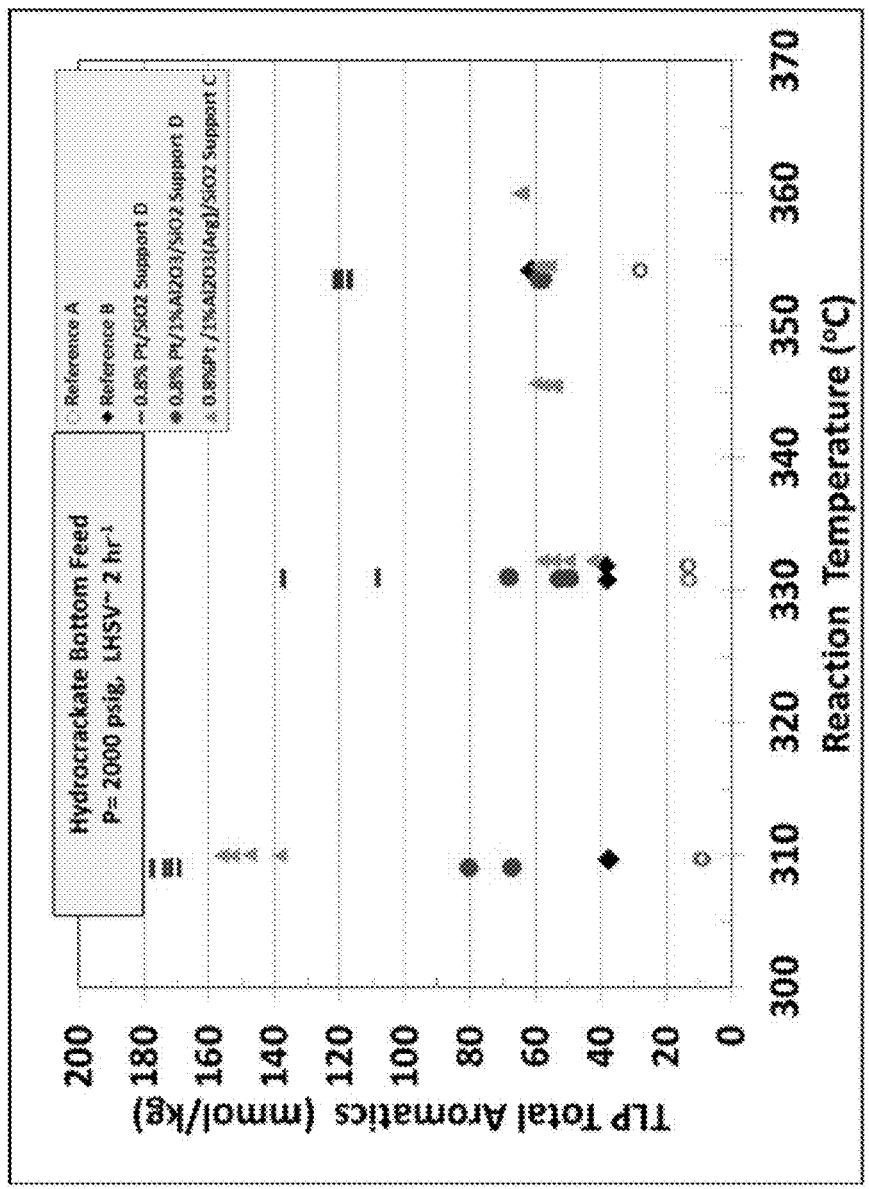
FIG. 12 shows results from aromatic saturation of a hydrocrackate bottoms feed.

FIG. 12 shows the results from performing aromatic saturation on the feed with the various catalysts. As shown in FIG. 12, at reaction temperatures of about 330° C. and higher the alumina-modified catalysts based on silica supports C and D had activities for aromatic saturation that were comparable to Reference B (commercially available alumina support). Processing the feed over Reference A resulted in lower levels of aromatics in the resulting effluent. However, the results demonstrate that comparable levels of aromatic saturation could be achieved using the alumina-modified catalysts based on silica supports C and D. This is in contrast to the comparative catalyst based on silica support D (no alumina modification), which had substantially higher aromatic contents in the effluent at all temperatures.

It is noted that the catalyst corresponding to References A and B had a density of at least 0.5 g/cm$^3$. This is in contrast to the catalysts based on silica supports C and D, which all had densities of roughly 0.45 g/cm$^3$ or less. Thus, at constant liquid hourly space velocity (measured by volume), a feed would be exposed to a greater weight of Reference A or B than the catalysts based on silica supports. Based on the roughly comparable activity of the alumina-modified catalysts based on silica supports C and D, the lower density of the catalysts based on silica supports C and D means that a lower mass of catalyst can be used to achieve comparable results. Since the amount of noble metal on a catalyst is based on the catalyst weight, this means that catalysts based on silica supports C and D can provide unexpectedly beneficial aromatic saturation activity while using a reduced amount of noble metal, relative to the commercial reference catalysts.

Figure 13:
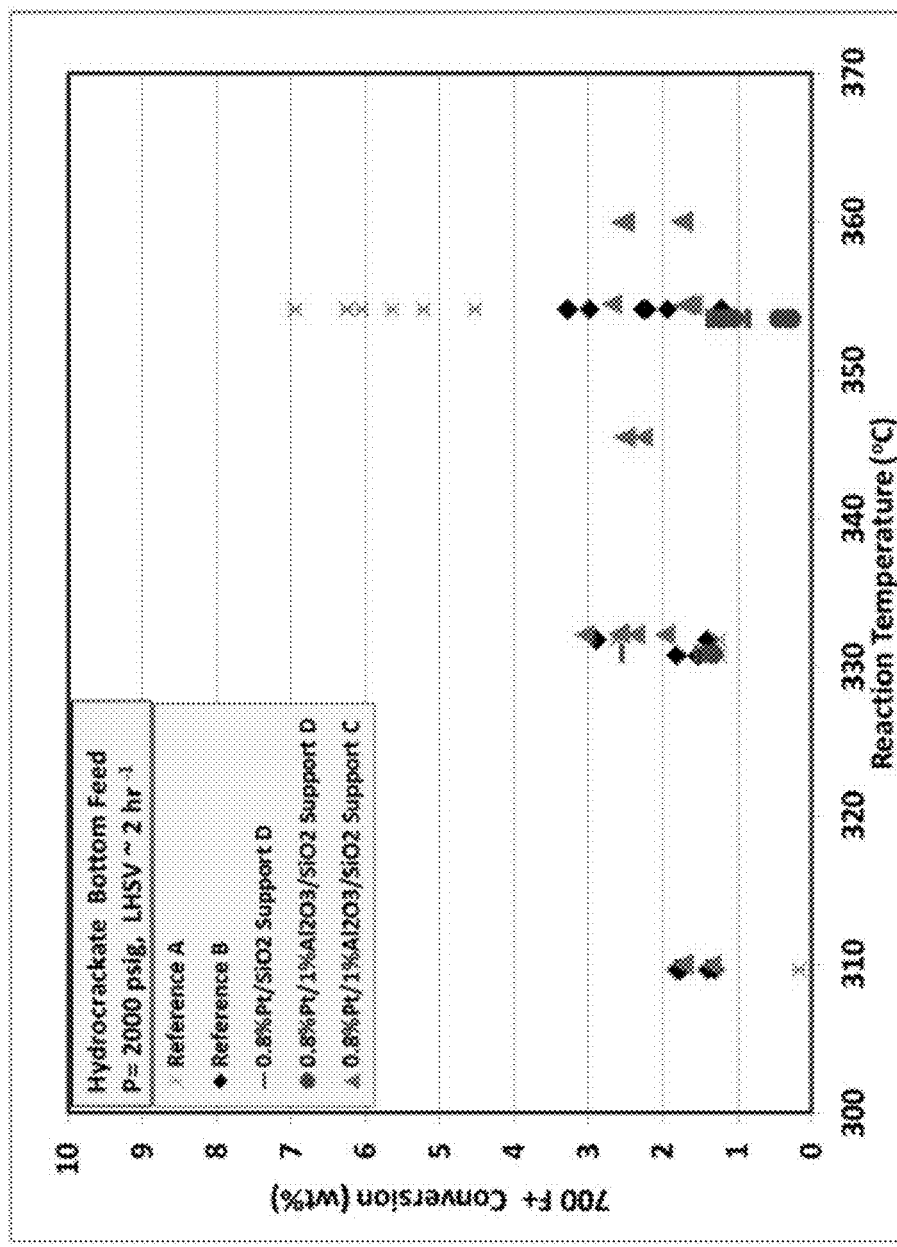
FIG. 13 shows results from aromatic saturation of a hydrocrackate bottoms feed.

In addition to providing comparable activity for aromatic saturation, the alumina-modified catalysts based on silica supports C and D had reduced activity for conversion (cracking) of the feed. FIG. 13 shows the 700° F.+ (~371° C.+) conversion for each of the pilot runs shown in FIG. 12. As shown in FIG. 13, all of the catalysts based on silica supports C and D resulted in less than 3 wt % conversion relative to 371° C. at all temperatures investigated. By contrast, exposing the feed to Reference A resulted in substantially higher amounts of feed conversion at temperatures of 330° C. and greater, with the conversion amounts being roughly twice the conversion (or more) relative to the conversion amounts from the catalysts based on silica supports C and D. As a result, the alumina-modified catalysts based on silica supports C and D provide an unexpectedly beneficial combination of increased aromatic saturation activity, reduced cracking activity, and lower catalyst density/lower noble metal content.

Additional Embodiments

Embodiment 1. A method for hydrogenating a feedstock, comprising: exposing a hydrocarbonaceous feedstock to a supported catalyst under effective hydrogenation conditions to form a hydrogenated effluent, the supported catalyst comprising a Group VIII noble metal on a silica support, the supported catalyst further comprising about 0.3 wt % to about 3.0 wt % alumina deposited on the silica support.

Embodiment 2. The method of Embodiment 1, wherein the hydrocarbonaceous feed comprises about 100 wppm of sulfur or less, or about 50 wppm of sulfur or less.

Embodiment 3. The method of Embodiment 2, wherein the catalyst comprises about 0.3 wt % to about 2.1 wt % alumina deposited on the silica support, or about 0.5 wt % to about 3.0 wt % alumina deposited on the silica support.

Embodiment 4. The method of Embodiment 1, wherein the hydrocarbonaceous feed comprises at least about 100 wppm of sulfur, or at least about 150 wppm of sulfur, or at least about 200 wppm of sulfur.

Embodiment 5. The method of Embodiment 4, wherein the catalyst comprises about 0.5 wt % to about 1.5 wt % alumina deposited on the silica support.

Embodiment 6. A method for forming a lubricant boiling range product, comprising: exposing a 600° F.+ (316° C.+) portion of a hydrocracked effluent to a supported catalyst under effective hydrogenation conditions to form a hydrogenated effluent, the supported catalyst comprising 0.1 wt % to 5.0 wt % of a Group VIII noble metal on a silica support, the supported catalyst further comprising about 0.3 wt % to about 2.5 wt % alumina deposited on the silica support, the supported catalyst having a ratio of aluminum atoms in tetrahedral sites to octahedral sites of at least 1.0; dewaxing the hydrogenated effluent under catalytic dewaxing conditions to form a dewaxed effluent; and hydrofinishing at least a portion of the dewaxed effluent under hydrofinishing conditions to form a hydrofinished effluent comprising a lubricant boiling range product.

Embodiment 7. The method of Embodiment 6, further comprising exposing a feedstock comprising a lubricant boiling range portion to a hydrocracking catalyst under hydrocracking conditions to form the hydrocracked effluent; and separating the hydrocracked effluent to form a fraction comprising the 600° F.+ (316° C.+) portion of the hydrocracked effluent.

Embodiment 8. The method of Embodiment 7, wherein the feedstock comprises a hydrotreated feedstock, optionally wherein the hydrotreated feedstock comprises a hydrotreated effluent, the hydrotreated effluent being cascaded to the hydrocracking catalyst without intermediate separation.

Embodiment 9. The method of any of Embodiments 6 to 8, wherein the ratio of aluminum atoms in tetrahedral sites to octahedral sites is at least 1.5, or at least 2.0.

Embodiment 10. The method of any of Embodiments 6 to 9, wherein the catalyst comprises 1.0 wt % (or 1.1 wt %) to 2.2 wt % (or 2.1 wt %) of alumina deposited on the silica support.

Embodiment 11. The method of any of the above embodiments, wherein the effective hydrogenation conditions comprise a temperature from about 25° C. to about 425° C., or about 75° C. to about 425° C., or about 100° C. to about 425° C., or about 180° C. to about 280° C.; a hydrogen partial pressure from about 100 psig (0.7 MPa) to about 3000 psig (20.7 MPa), or about 500 psig (3.4 MPa) to about 2500 psig (17.2 MPa); a liquid hourly space velocity from about 0.1 $hr^{-1}$ to about 5 $hr^{-1}$ LHSV, or about 0.5 $hr^{-1}$ to about 1.5 $hr^{-1}$; and a hydrogen treat gas rate of from about 35.6 $m^3/m^3$ to about 1781 $m^3/m^3$ (200 SCF/B to 10,000 SCF/B).

Embodiment 12. The method of any of the above embodiments, wherein the supported catalyst comprises about 0.1 wt % to about 5.0 wt % of the Group VIII noble metal, or about 0.1 wt % to about 2.0 wt % of the Group VIII noble metal.

Embodiment 13. The method of any of the above embodiments, wherein the Group VIII noble metal is Pt, Pd, Rh, Ir, or a combination thereof; or wherein the Group VIII noble metal is Pt, Pd, or a combination thereof; or wherein the Group VIII noble metal is Pt.

Embodiment 14. The method of any of the above embodiments, wherein the Group VIII noble metal is Pt or a combination of Pt and one or more of Pd, Rh, or Ir, a molar ratio of Pt to the one or more of Pd, Rh, or Ir optionally being at least about 1:1, or at least about 3:1, or at least about 5:1.

Embodiment 15. The method of any of the above embodiments, wherein the alumina is deposited on the silica support by impregnation.

Embodiment 16. The method of any of the above embodiments, wherein the supported catalyst comprises amorphous silica, a mesoporous silica, or a combination thereof.

Embodiment 17. A hydrogenation catalyst, comprising: 0.1 wt % to 5.0 wt %, based on total catalyst weight, of a Group VIII noble metal on a silica support; and 1.0 wt % to 2.5 wt %, based on a total catalyst weight, of alumina deposited on the silica support, the catalyst having a ratio of aluminum atoms in tetrahedral sites to octahedral sites of at least 1.0, wherein the silica support is an amorphous silica support, a mesoporous silica support, or a combination thereof.

Embodiment 18. The hydrogenation catalyst of Embodiment 17, wherein the Group VIII noble metal is Pt, Pd, Rh, Ir, or a combination thereof; or wherein the Group VIII noble metal is Pt, Pd, or a combination thereof; or wherein the Group VIII noble metal is Pt.

Embodiment 19. The hydrogenation catalyst of Embodiment 17, wherein the Group VIII noble metal is Pt or a combination of Pt and one or more of Pd, Rh, or Ir, a molar ratio of Pt to the one or more of Pd, Rh, or Ir optionally being at least about 1:1, or at least about 3:1, or at least about 5:1.

Embodiment 20. The hydrogenation catalyst of any of Embodiments 17 to 19, wherein the supported catalyst comprises about 0.1 wt % to about 2.0 wt % of the Group VIII noble metal.

Embodiment 21. The hydrogenation catalyst of any of Embodiments 17 to 20, wherein the ratio of aluminum atoms in tetrahedral sites to octahedral sites is at least 1.5, or at least 2.0.

Embodiment 22. The hydrogenation catalyst of any of Embodiments 17 to 21, wherein the catalyst comprises 1.0 wt % (or 1.1 wt %) to 2.2 wt % (or 2.1 wt %) of alumina deposited on the silica support.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for forming a lubricant boiling range product, comprising:
    exposing a 600° F.+ (316° C.+) portion of a hydrocracked effluent to a supported catalyst under effective hydrogenation conditions to form a hydrogenated effluent, the supported catalyst comprising 0.1 wt % to 5.0 wt % of a Group VIII noble metal on a silica support, the supported catalyst further comprising 0.3 wt % to 2.5 wt % alumina deposited on the silica support, the supported catalyst having a ratio of aluminum atoms in tetrahedral sites to octahedral sites of at least 1.0, the supported catalyst having a relative acidity of less than 1 when measured using the 2MP2 Isomerization Test, wherein less than 3 wt % of the molecules in the hydrocracked effluent boiling above 700° F. are converted to molecules boiling below 700° F. in the hydrocracked effluent when measured at a reaction temperature of 354° C.;
    dewaxing the hydrogenated effluent under catalytic dewaxing conditions to form a dewaxed effluent; and
    hydrofinishing at least a portion of the dewaxed effluent under hydrofinishing conditions to form a hydrofinished effluent comprising a lubricant boiling range product.

2. The method of claim 1, further comprising exposing a feedstock comprising a lubricant boiling range portion to a hydrocracking catalyst under hydrocracking conditions to form the hydrocracked effluent; and
    separating the hydrocracked effluent to form a fraction comprising the 600° F.+ (316° C.+) portion of the hydrocracked effluent.

3. The method of claim 2, wherein the feedstock comprises a hydrotreated feedstock.

4. The method of claim 3, wherein the hydrotreated feedstock comprises a hydrotreated effluent, the hydrotreated effluent being cascaded to the hydrocracking catalyst without intermediate separation.

5. The method of claim 1, wherein the 600° F.+ (316° C.+) portion of the hydrocracked effluent comprises 50 wppm or less of sulfur.

6. The method of claim 1, wherein the catalyst comprises 0.3 wt % to 2.1 wt % alumina deposited on the silica support.

7. The method of claim 1, wherein the catalyst comprises 0.5 wt % to 2.2 wt % alumina deposited on the silica support.

8. The method of claim 1, wherein the effective hydrogenation conditions comprise a temperature from 75° C. to 425° C.; a hydrogen partial pressure from 100 psig (0.7MPa) to 3000 psig (20.7 MPa); a liquid hourly space velocity from 0.1 hr $^{-1}$ to 5 hr −1 LHSV; and
    a hydrogen treat gas rate of from 35.6 m$^3$/m$^3$ to 1781 m$^3$/m$^3$ (200 SCF/B to 10,000 SCF/B).

9. The method of claim 1, wherein the Group VIII noble metal comprises Pt.

10. The method of claim 9, wherein the Group VIII noble metal further comprises one or more of Pd, Ir, or Rh, a molar ratio of Pt to the one or more of Pd, Ir, or Rh being at least 1: 1.

11. The method of claim 9, wherein the supported catalyst comprises 0.1 wt % to 2.0 wt % of the Group VIII noble metal.

12. The method of claim 1, wherein the ratio of aluminum atoms in tetrahedral sites to octahedral sites is at least 1.5.

* * * * *